US007260147B2

(12) United States Patent
Gordon et al.

(10) Patent No.: US 7,260,147 B2
(45) Date of Patent: Aug. 21, 2007

(54) DATA STRUCTURE AND METHODS FOR PROVIDING AN INTERACTIVE PROGRAM GUIDE

(75) Inventors: Donald F. Gordon, Los Altos, CA (US); Sadik Bayrakeri, Foster City, CA (US); Joseph R. Wild, Santa Clara, CA (US); Jeremy S. Edmonds, Sunnyvale, CA (US); Edward A. Ludvig, Redwood City, CA (US); John P. Comito, Redwood City, CA (US); Eugene Gershtein, Redwood Shores, CA (US)

(73) Assignee: Sedna Patent Services, LLC, Philadelphia, PA (US)

( * ) Notice: Subject to any disclaimer, the term of this patent is extended or adjusted under 35 U.S.C. 154(b) by 806 days.

(21) Appl. No.: 10/464,370

(22) Filed: Jun. 17, 2003

(65) Prior Publication Data

US 2003/0208759 A1    Nov. 6, 2003

Related U.S. Application Data

(62) Division of application No. 09/293,535, filed on Apr. 15, 1999, now Pat. No. 6,584,153.

(60) Provisional application No. 60/093,891, filed on Jul. 23, 1998.

(51) Int. Cl.
*H04N 7/12* (2006.01)
*H04N 5/445* (2006.01)

(52) U.S. Cl. .................................. 375/240.13; 725/39
(58) Field of Classification Search ........... 375/240.13, 375/240.01, 240.25; 725/39, 61, 87, 136, 725/46; 348/564
See application file for complete search history.

(56) References Cited

U.S. PATENT DOCUMENTS 5,633,683 A * 5/1997 Rosengren et al. ..... 375/240.01
5,847,771 A * 12/1998 Cloutier et al. ............. 348/564
6,256,785 B1 * 7/2001 Klappert et al. ............ 725/136

\* cited by examiner

*Primary Examiner*—Gims Philippe
(74) *Attorney, Agent, or Firm*—Patterson & Sheridan, LLP

(57) ABSTRACT

A data structure suited to efficiently representing a plurality of image streams including common and non-common portions. Specifically, a plurality of similar group of picture (GOP) data structures representing the corresponding plurality of image streams including common and non-common portions is adapted to provide a first encoded stream comprising only P-picture and B-picture access units of one of the similar GOP data structures, and a corresponding plurality of encoded streams comprising only respective I-picture access units of the similar GOP data structures. In this manner, the redundant P-picture and B-picture access units within the encoded streams are eliminated, thereby greatly reducing the bandwidth or memory resources needed to transmit or store the plurality of image streams.

28 Claims, 9 Drawing Sheets

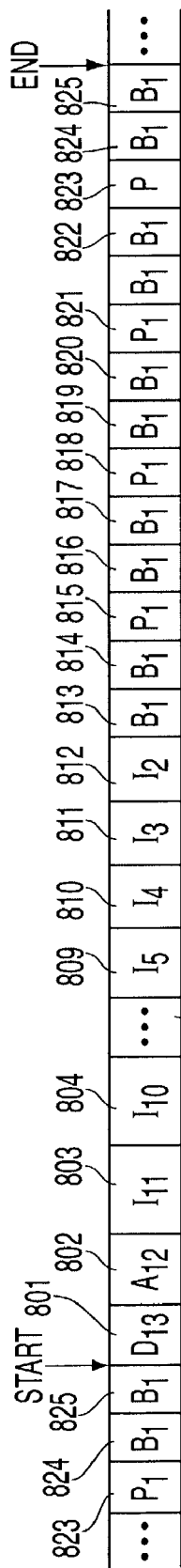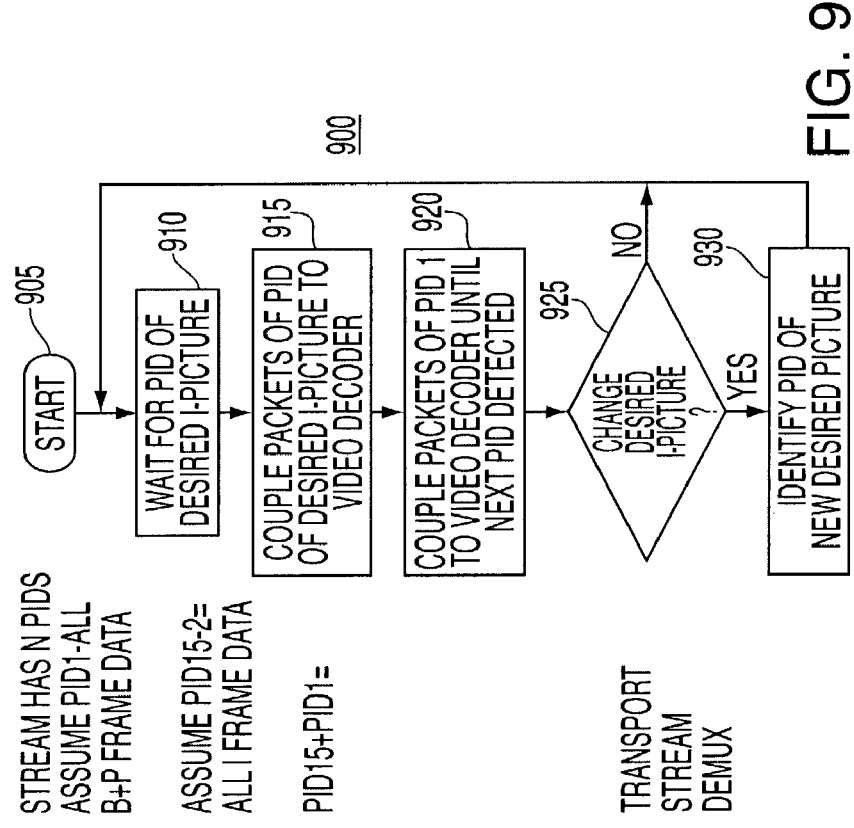
FIG. 8
FIG. 9

DATA STRUCTURE AND METHODS FOR PROVIDING AN INTERACTIVE PROGRAM GUIDE

CROSS REFERENCE TO RELATED APPLICATIONS

This application is a divisional of U.S. patent application Ser. No. 09/293,535, filed Apr. 15, 1999, now U.S. Pat. No. 6,584,153, which application claims benefit of U.S. Provisional patent application Ser. No. 60/093,891 filed Jul. 23, 1998; such applications are hereby incorporated by reference in their entireties.

This application is related to U.S. patent application Ser. No. 09/293,526, filed Apr. 15, 1999, which is incorporated herein by reference in its entirety.

The invention relates to communications systems in general and, more specifically, the invention relates to an interactive electronic program guide suitable for use in an interactive video information delivery system.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1, refers to the ISO/IEC standards 11172 and is incorporated herein by reference. The second, known as MPEG-2, refers to the ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

Over the past few years, television has seen a transformation in the variety of means by which its programming is distributed to consumers. Cable television systems are doubling or even tripling system bandwidth by migrating to hybrid fiber coaxial (HFC) cable as an information delivery medium. Many consumers have turned to direct broadcast satellite (DBS) systems to receive higher quality (with respect to NTSC) video imagery. Other video information delivery approaches using high bandwidth digital technologies, intelligent two way set top boxes and other methods are used by information providers to offer services that are differentiated from standard cable and over the air broadcast systems.

With this increase in bandwidth, the number of programming choices has also increased. Leveraging off the availability of more intelligent set top boxes, several companies such as Starsight® and Prevue™ Guide have developed elaborate systems for providing an interactive listing of the vast array of channel offerings, expanded textual information about individual programs, the ability to look forward to plan television viewing as much as several weeks in advance, and the option of automatically programming a VCR to record a future broadcast of a television program.

An interactive digital video on demand (VOD) service known as the DIVA system is manufactured by DIVA Systems Corporation of Menlo Park, Calif. The DIVA system distributes audio-visual information to individual subscribers utilizing MPEG-like information streams. DIVA subscribers utilize intelligent set top terminals (STT).

Unfortunately, the existing program guides have several drawbacks. They tend to require a lot of memory, some of them needing upwards of one megabyte of set top terminal memory. They are typically very slow to acquire their current database when they are turned on for the first time or are subsequently restarted (e.g., a large database may be downloaded to a set top terminal using only a vertical blanking interval (VBI) data insertion technique). Disadvantageously, such slow database acquisition may result in out of date database information or, in the case of a pay per view (PPV) or video on demand (VOD) system, limited scheduling flexibility for the information provider. Additionally, the user interface to existing program guides does not usually look like a typical television control interface; rather the user interface looks like a 1980s style computer display (i.e., blocky, ill-formed text and/or graphics).

Therefore, it is seen to be desirable to provide a method and apparatus for providing the functionality of electronic program guide in a manner tending to reduce the above-described problems.

SUMMARY OF THE INVENTION

The invention provides a data structure suited to efficiently representing a plurality of image streams including common and non-common portions. Specifically, a plurality of similar group of picture (GOP) data structures representing the corresponding plurality of image streams including common and non-common portions is adapted to provide a first encoded stream comprising only P-picture and B-picture access units of one of the similar GOP data structures, and a corresponding plurality of encoded streams comprising only respective I-picture access units of the similar GOP data structures. In this manner, the redundant P-picture and B-picture access units within the encoded streams are eliminated, thereby greatly reducing the bandwidth or memory resources needed to transmit or store the plurality of image streams.

A data structure according to the invention comprises: a multiplexed stream comprising a plurality of video streams representing respective first portions of a group of pictures (GOP) information structure, each of the respective first portions including an access unit associated with an I-picture and a video stream representing a remaining portion of the GOP information structure including at least one of an access unit associated with a P-picture and an access unit associated with a B-picture, wherein: a concatenation of one of the respective first portions of the GOP information structure and the second portion of the GOP structure results in a complete GOP information structure.

BRIEF DESCRIPTION OF THE DRAWINGS

The teachings of the present invention can be readily understood by considering the following detailed description in conjunction with the accompanying drawings, in which:

FIG. 8 depicts a data structure produced by the apparatus of FIG. 6;

FIG. 9 depicts a method for processing the data structure described in FIG. 8.

To facilitate understanding, identical reference numerals have been used, where possible, to designate identical elements that are common within a figure.

DESCRIPTION OF THE EMBODIMENT

The invention will be described within the context of an interactive information distribution system, illustratively the DIVA interactive digital video on demand (VOD) system. However, it will be readily apparent to those skilled in the art that the teachings of the present invention may be advantageously utilized in other interactive video information distribution systems.

Figure 1:
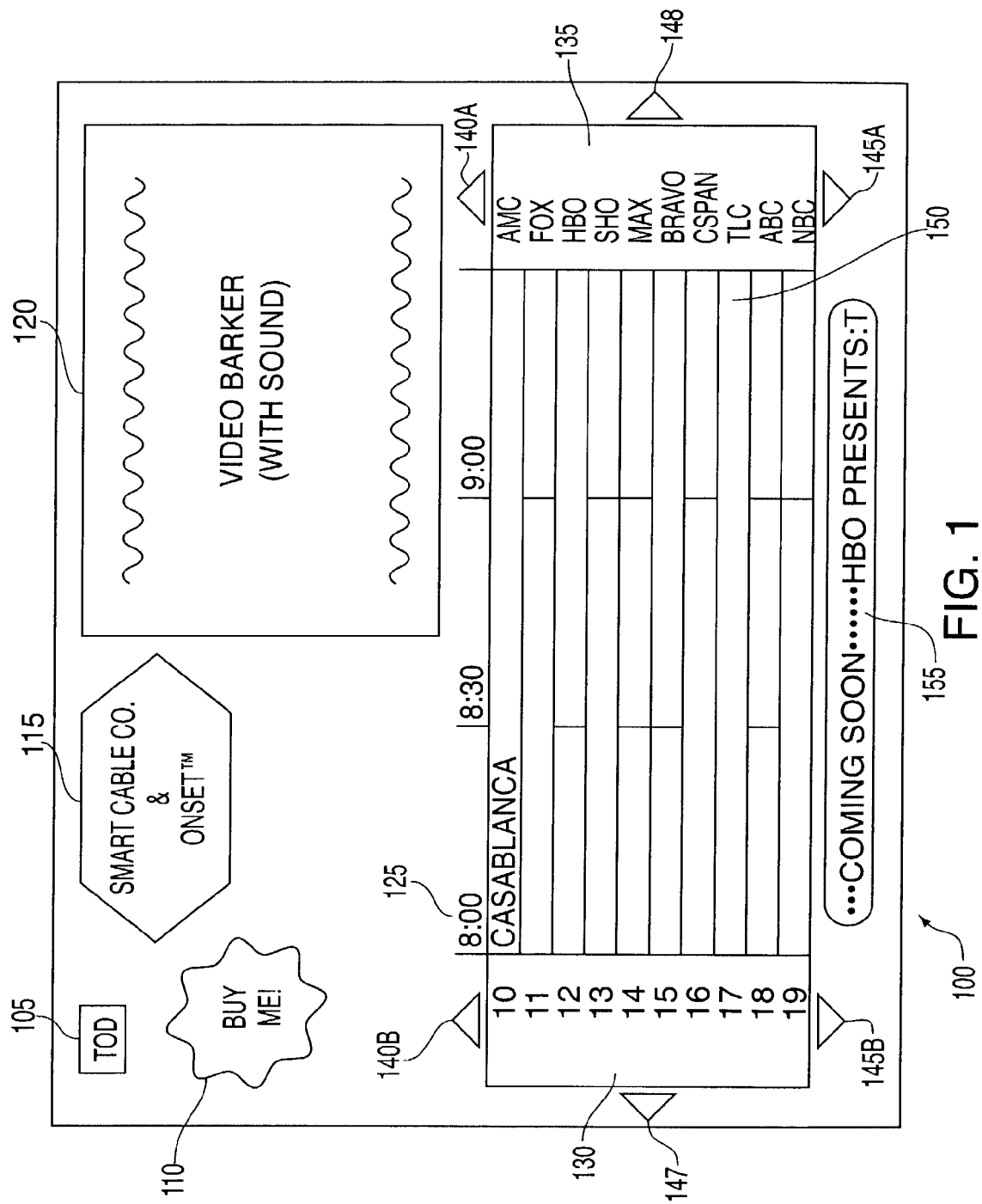
FIG. 1 depicts a display screen of an interactive electronic program guide (IEPG)

FIG. 1 depicts a display screen 100 of an interactive electronic program guide (IEPG) according to the invention. Specifically, the exemplary interactive program guide screen 100 comprises a time of day/date (DOT) indicator 105, a promotional "splash" object 110, a cable system or provider logo 115, a video barker 120 (and associated audio barker), a program time indicator 125, a channel number indicator 130, a channel identifier (text or logo) 135, a pair of channel display decrement objects 140a and 140b, a pair of channel display increment objects 145a and 145b, a temporal increment object 148, a temporal decrement object 147, a program grid 150 and a scrolling promotional banner 155. The interactive program guide display 100 is displayed on a television screen or other video presentation device in, e.g., the home of a subscriber to a cable television or other information distribution system utilizing the interactive electronic program guide. Subscriber side equipment suitable for receiving and displaying is described in detail in FIG. 2.

Referring to FIG. 1, the interactive program guide display 100 is comprised of a video layer and a graphics layer. That is, the IEPG display 100 is primarily formed at a central or head end location in, for example., a cable television system. Video information representative of each of the objects or elements previously described (105-155) is generated at the cable central processing location or a head end, and transmitted as part of a video stream. Thus, the actual display parameters (i.e., the size, shape, color, position and other visual parameters) associated with each object are entirely controlled at a central location.

Those on screen objects which may be modified by the subscriber are selected by, e.g., a remote control device cooperating with the set top terminal, which causes the locally stored and/or locally generated graphical overlay objects to be manipulated in a manner identifying the objects on the screen produced at the head end. That is, each manipulable object or element is associated with a corresponding graphical overlay element (e.g., an x-y coordinate box or other element). The overlay element has selectively emphasized or de-emphasized (e.g., selectively shading, highlighting coloring and the like) via manipulation of the remote control unit.

Upon receiving a "select" entry from the remote control unit, the set top terminal transmits, via a back channel, the information that identifies the selected object to the head end. It is important to note that changing the emphasis of an object or element is performed entirely at the local level. That is, there is no change in the actual video information transmitted by the head end to the subscriber. Only the graphical overlay layer on the display is changed.

The user interaction manipulations are those manipulations that are intended by the user to change a particular emphasis or overlay highlighting or overlay position on the screen. By contrast, other manipulations may be intended to change video information displayed on the screen such as the position (temporal or channel) of the program grid, selection of a promotional object and the like.

The interactive program guide display 100 (i.e., the video layer provided by the head end) depicts a program offering of 10 channels within a 1.5 hour time interval. Since there are 24 hours in a day, 16 video streams are required to depict 24 hours of program offerings of 10 channels. These 16 video streams may be included within a single transport stream. Thus, a user desiring to view the next 1 ½ hour time interval (e.g., 9:30-11:00) may activate a "scroll right" object (or move the joystick to the right when a program within program grid 150 occupies the final displayed time interval). Such activation will result in the controller of the STT noting that a new time interval is desired. The video stream corresponding to the new time interval will then be decoded and displayed. If the corresponding video stream is within the same transport stream (i.e., a new PID), then the stream will be immediately decoded and presented. If the corresponding video stream is within a different transport stream, then the different transport stream will be extracted from the broadcast stream and the appropriate video stream will be decoded and presented. If the different broadcast stream is within a different broadcast stream, then the different broadcast stream will be tuned, the different transport stream will be extracted from the different broadcast stream and the appropriate video stream will be decoded and presented.

Similarly, a user interaction resulting in a prior time interval or a different set of channels will result in the retrieval and presentation of an appropriate video stream. It is important to note that each extracted video stream is associated with a common audio stream. Thus, the video/audio barker function of the program guide is continuously provided, regardless of the selected video stream.

The above described user manipulations, and the resulting change in presented video streams, are all within the same "context" of the program guide. That is, the context of the program guide (i.e., the contextual model) described thus far is the "program guide" context in which user manipulations to the guide are used to modify the attributes of the program grid. In the event of a user selection of a highlighted or emphasized program within the program grid, the context changes to a "program selected" context, in which the video and audio information streams associated with a selected channel are retrieved and presented to the user. The selection information is coupled to the head end a the back channel. The head end then couples the appropriate streams to the user, if they are not already being received by the user. In the program selection context, the user may have selected a broadcast stream (i.e., a network feed), a narrowcast stream (a regional or local information feed, such as a community or public access channel) or a pointcast stream (such as a pay per view event or interactive shopping channel).

After the user has finished viewing or otherwise utilizing a selected program, the operating context of the STT/program guide will return to the program guide context. That is, any pointcast or narrowcast "session" that was initiated due to the selection of a program will be torn down upon completion of that program. The user will be returned to the broadcast streams associated with the program guide of the present invention. The concept of contextual shifting and the implications for bandwidth utilization described in more detail below. Briefly, the invention operates to maximally utilize the bandwidth within an interactive information distribution system by allocating system functionality to system components (i.e., server side and subscriber side) such that a common interactive program guide may be provided by the head end to multiple subscribers via a broadcast (i.e., non-specific subscriber delivery) technique, which requires less expensive transmission techniques than those used for pointcast (i.e., subscriber specific delivery) transmission techniques.

Figure 2:
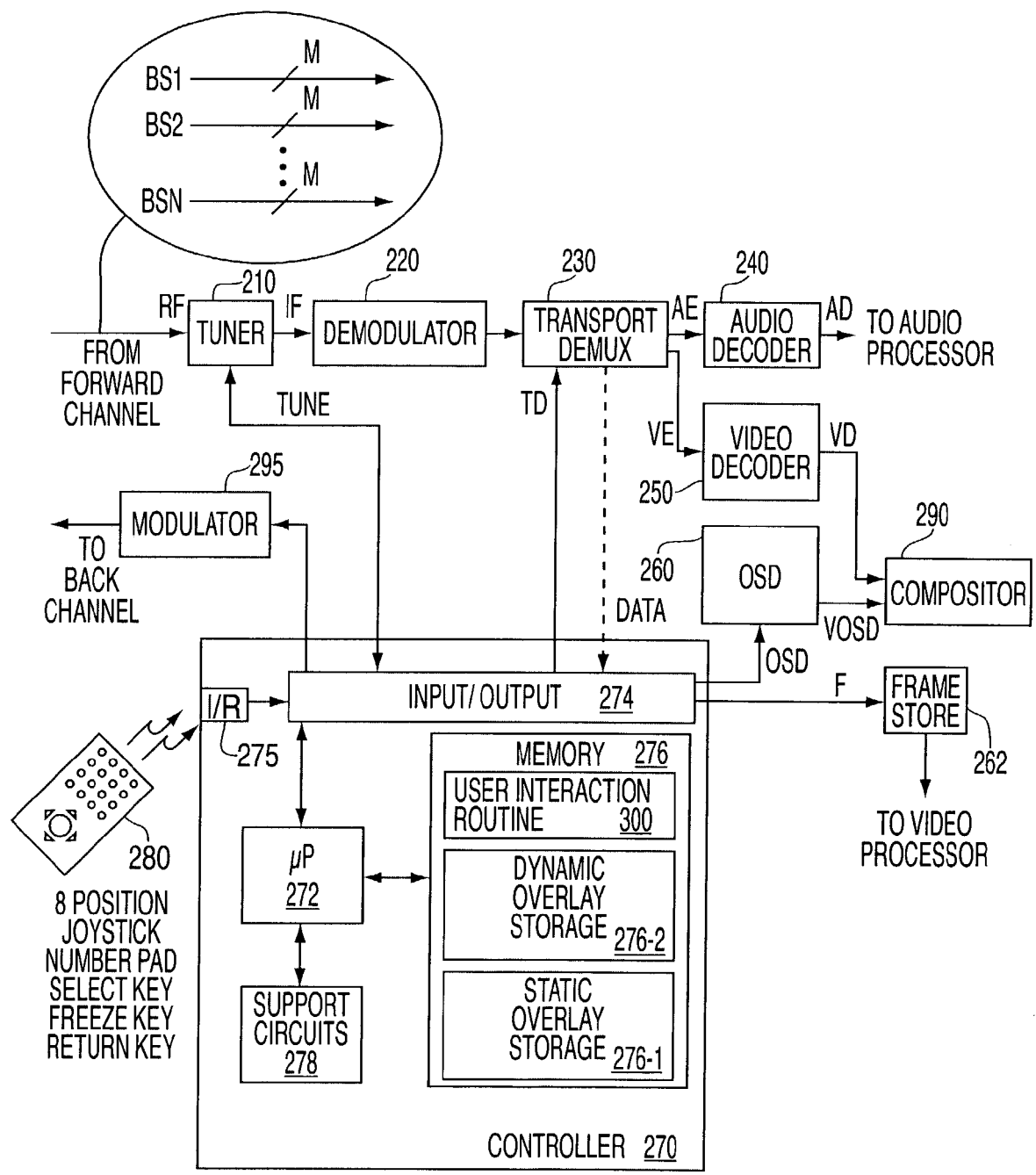
FIG. 2 depicts an example if a subscriber side equipment suitable for use in an interactive information distribution system.

FIG. 2 depicts a subscriber side equipment suitable for use in the present invention. Specifically, FIG. 2 depicts a set top terminal (STT) comprising a tuner 210, a demodulator 220, a transport demultiplexer 230, an audio decoder 240, a video decoder 250, an on screen display processor (OSD) 260, a frame store memory 262, a compositor 290 and a controller 270. User interaction is effected via a remote control unit 280. Tuner 210 receivers, e.g., a radio frequency (RF) signal comprising a plurality of quadrature amplitude modulated (QAM) information signals from a forward channel such as a hybrid fiber optic cable television system. Tuner 210, in response to a control signal TUNE, tunes to a particular one of the QAM information signals to produce an intermediate frequency (IF) information signal. Demodulator 220 receives and demodulates the intermediate frequency QAM information signal to produce an information stream, illustratively an MPEG transport stream. The MPEG transport stream is coupled to a transport stream demultiplexer 230.

Transport stream demultiplexer 230, in response to a control signal TD produced by controller 270, demultiplexes (i.e., extracts) an audio information stream A and a video information stream V. The audio information stream A is coupled to audio decoder 240, which decodes the audio information stream and presents the decoded audio information stream to an audio processor (not shown) for subsequent presentation. The video stream V is coupled to the video decoder 250, which decodes the compressed video stream V to produce an uncompressed video stream VD that is coupled to the compositor 290. OSD 260, in response to a control signal OSD produced by controller 270, produces a graphical overlay signal VOSD that is coupled to the compositor 290.

Optionally (e.g., in the absence of a default or predetermined overlay design), transport stream demultiplexer 230 retrieves a data stream DATA, illustratively an auxiliary data stream or user data stream according to, e.g., the MPEG standards, The retrieved stream DATA provides information regarding overlay parameters and other program guide information. The data stream may also include the other profile parameters inserted into the forward channel bitstreams by a profile unit 460 of FIG. 4 (described below).

Additionally, in one embodiment the data stream identifies, sequence header location, GOP structure, coding parameters, PID locations, program map tables and other information suitable for use by controller 270 in, e.g., selecting appropriate decoding or processing parameters.

The compositor 290 merges the graphical overlay signal VOSD and the uncompressed video stream VD to produce a modified video stream (i.e., the underlying video images with the graphical overlay) that is coupled to the frame store unit 262. The frame store unit 262 stores the modified video stream on a frame-by-picture basis according to the frame rate of the video stream. Frame store unit 262 provides the stored video frames to a video processor (not shown) for subsequent processing and presentation on a display device. The frame store unit 262, in response to a control signal F produced by the controller 270, "freezes" in memory (i.e., does not update) a presently stored video frame such that the video information provided to the video process results in a still image. This is useful when, e.g., a broadcast program guide utilizes scrolling information, a telephone number or address is briefly displayed or a user simply wants to view a presently displayed frame for a longer period of time.

Controller 270 comprises a microprocessor 272, an input/output module 274, a memory module 276, an infrared (IR) receiver 275 and support circuitry 278. The microprocessor 272 cooperates with conventional support circuitry 278 such as power supplies, clock circuits, cache memory and the like as well as circuits that assist in executing the software routines. The input/output circuitry 274 forms an interface between the controller 270 and the tuner 210, the transport demultiplexer 230, the onscreen display unit 260, the back channel modulator 295, and the remote control unit 280. Although the controller 270 is depicted as a general purpose computer that is programmed to perform specific interactive program electronic guide control function in accordance with the present invention, the invention can be implemented in hardware as an application specific integrated circuit (ASIC). As such, the process steps described herein are intended to be broadly interpreted as being equivalently performed by software, hardware, or a combination thereof.

In the exemplary embodiment of FIG. 2, the remote control unit 280 comprises an 8-position joy stick, a numeric pad, a "select" key, a "freeze" key and a "return" key. User manipulations of the joy stick or keys of the remote control device are transmitted to a controller via an infra red (IR) link. The controller 270 is responsive to such user manipulations at several levels of abstraction. Specifically, the controller interprets user manipulations as interaction model manipulations or interface model manipulations, which are described below.

Interaction model manipulations are those manipulations which depend only upon local processing resources, such as changing overlay object emphasis or selecting a new video stream within a previously tuned and demodulated transport stream (i.e., a sub-stream having only a different packet id (PID) than the presently displayed sub-stream or tuning to another channel already present in the broadcast spectrum). Interface model manipulations are those manipulations which require interaction with the head end, such as selection of an object that requires a change from a broadcast mode of operation to a pointcast mode of operation. These modes will be described in more detail below. Briefly, in a broadcast mode of operation, many subscribers receive and utilize the same information stream. In a pointcast mode of operation, only one subscriber receives and utilizes a particular information stream.

Referring to FIG. 1, emphasis and selection of promotional splash 110 changes the context from the program guide context to a shopping guide context. Within the shopping guide context the user is allocated an individual interactive information stream (i.e., a pointcast stream) allowing the user to buy a particular product, browse a particular group of products or otherwise interact with the server. Similarly, selection of the logo object 115 or any of the channel objects 135 or channel number objects 130 results in a narrowcast information stream that provides the user with general information associated with the companies or individuals identified with the logos or channel boxes. Within a narrowcast context just described, a user may change to a pointcast context to retrieve more particularized information. Similarly, if the user emphasizes and selects the video barker object 120 a new stream is provided to the user in which the video barker may be displayed at full screen resolution or a promotional screen other than the video barker may be displayed. Optionally, ordering information for a pay preview event represented by the video barker may also be provided. Scrolling promotional banner 155 may also be selected, bringing the user to a narrowcast or broadcast stream that provides a promotional video barker or other information. It should be noted that the time of day information and date information 105 may be retrieved by the subscriber and utilized to synchronize the clock within the subscriber terminal.

The interactive program guide 100 depicted in FIG. 1 is formed using a single video stream having an associated audio stream and a corresponding graphic overlay. The program guide display 100 depicts an hour and a half time interval for each of ten channels. Thus, to depict an entire 24-hour time interval for ten channels, it is necessary to provide 16 separate images or display screens of information. Each particular video screen may be associated with a packet ID (PID) value. A plurality of such video streams may be included within a single transport stream.

Figure 3:
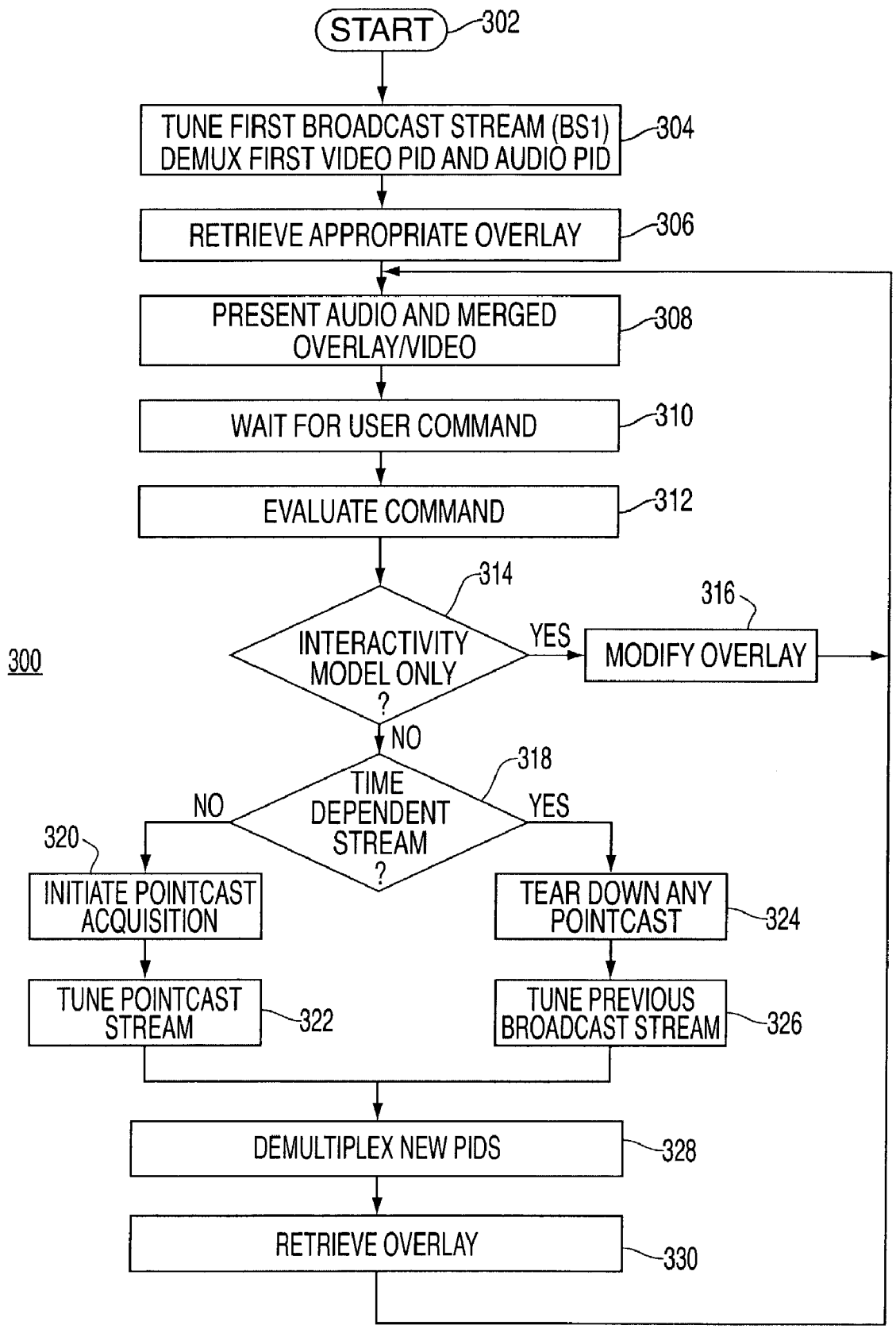
FIG. 3 depicts a flow diagram of a user interaction routine suitable for use in a subscriber side equipment of FIG. 2.

FIG. 3 depicts a flow diagram of a user interaction routine 300 suitable for use in the subscriber side of equipment of FIG. 2, and more particularly, suitable for use in the controller 270 of the subscriber side equipment depicted in FIG. 2. The routine 300 is entered at step 302, when the subscriber side equipment is powered on. The routine 300 then proceeds to step 304, where a first or default broadcast stream from the forward channel is tuned by RF tuner 210 in response to a control signal TUNE provided by controller 270. The tuned broadcast stream, illustratively BS1, is demodulated by demodulator 220 to produce one or more transport streams which are coupled to transport stream demultiplexer 230. A video stream having a default packet ID (PID) and an audio stream having a default packet ID (PID) are demultiplexed by transport stream demultiplexer 230 to produce an encoded audio stream AE and an encoded video stream VE.

After tuning the first broadcast stream and demultiplexing the first video stream and associated audio stream (step 304), the routine 300 proceeds to step 306, where an appropriate overlay is retrieved from memory unit 276. That is, a default overlay, e.g., an overlay stored in static overlay storage unit 276-1 in a memory unit 276, may be retrieved by the controller 270 and coupled to the OSD generator 260. Optionally, as previously discussed, transport demultiplexer 230 also demultiplexes a control and applet data stream, illustratively an auxiliary data stream included with the signal received via a forward channel. This data stream may include specific overlay information intended to be used with the received program stream and stored in the dynamic overlay storage unit 276-2. Alternatively, the received data stream may include simply X-Y grid coordinates that may be used to calculate an appropriate overlay for the video stream. The overlay information may simply be default information suitable for use in a fixed (i.e., predetermined) on screen program guide display. Upon retrieving the appropriate overlay, the routine 300 proceeds to step 308.

At step 308 routine 300 presents the merged overlay and video information stream. That is, the decoded video stream VD produced by video decoder 250 and the on-screen display stream VOSD produced by OSD unit 260 are merged together by compositor 290 to produce a merged video stream which is then coupled to a video processor (not shown) for further processor prior to presentation on a display device. Contemporaneously, audio decoder 240 is decoding the appropriate audio channel, i.e., the audio information stream associated with the audio PID of step 304, which is then coupled to an audio processor for subsequent presentation by a set of speakers. The routine 300 then proceeds to step 310, where it waits for a user command. Upon receipt of a user command, i.e., upon receipt of a joy stick manipulation indicative of an on-screen program guide command such as a change in object emphasis or a selection of an object or other related commands, the routine proceeds to step 312, where the received user command is evaluated.

After evaluation the received user command (step 312) the routine 300 proceeds to step 314, where a query is made as to whether the received command requires processing at an interactivity model level only. That is, whether the received command is simply directed towards changing the on screen object presently emphasized (interactivity model only or set top terminal processing only), or directed towards retrieving information found in a different video stream. For example, a non interactivity model command includes commands that change the contents of the program grid 150 (i.e., different channels or different displayed time intervals), commands that indicate a selection of an emphasized object (i.e., selection of a promotional banner or object, selection of a channel, increment or decrement of the presently displayed channels such that a different video stream is required, increment or decrement of the displayed temporal intervals such that a different video stream is required, and so on.

If the query in step 314 is answered affirmatively, then the routine goes to step 316, where the overlay is modified. That is, the presently emphasized object is de-emphasized by the on-screen display unit 260 and emphasis is placed on a different object. For example, referring to the electronic program guide display 100 of FIG. 1, if the promotional object 110 is presently highlighted, and the user moves the joy stick in a manner indicating an intent to select the logo object 115 (i.e., an upper right movement of the joy stick), then the overlay is modified by de-emphasizing object 110 and emphasizing object 115. The routine 300 then proceeds to step 308, where the audio and merged overlay and video information are presented.

If the query at step 314 is answered negatively, then the routine then proceeds to step 318, where a query is made as to whether a time-dependent stream is being selected. That is, if the query at step 314 is answered negatively, then the received command is such that an additional video information stream is to be selected. At step 318 a query is made as to whether that additional video information stream to be selected is one of a time-dependent stream or a time-independent stream. A time-dependent stream is a stream that is either broadcast or narrowcast to a plurality of subscribers. That is, a time-dependent stream is a stream received by many subscribers such that no one subscriber may control the transmission of that stream. A time-dependent stream comprises, e.g., a pointcast stream such as an interactive shopping channel, a pay preview channel and the like.

If the query at step 318 is answered negatively, the routine 300 proceeds to step 320, where point cast stream acquisition is initiated. That is, at step 320, the process of initiating a point cast session is started by transmitting appropriate information to the server side via the back channel. The routine 300 then proceeds to step 322, where the appropriate pointcast stream is tuned. The routine 300 then proceeds to step 328, where the video and audio stream (i.e., the PID associated with video and the PID associated with audio) streams are demultiplexed by transport demultiplexer 230. The routine 300 then proceeds to step 330, where an appropriate overlay is retrieved, and to step 308, for the audio and video merged with overlay streams are presented. In the case of a pay preview presentation, the overlay may comprise a transparent overlay, such that there is no on-screen display associated with a pay preview presentation. Optionally, the overlay may comprise a small icon or logo to indicate which pay preview channel or which cable channel has been selected for processing.

If the query at step 318 is answered affirmatively, then the routine proceeds to step 324, where any existing narrowcast/pointcast session is turn down, and to step 326, where the last broadcast stream tuned by the subscriber side equipment is re-tuned and the associated transport stream or streams are re-acquired. In this manner, in the event of a user selecting a particular pay preview or other context changing program, the changed context will be returned to the initial program guide context upon exiting the context changing (i.e., time independent stream). The routine 300 then proceeds to step 328, where the video and associated audio streams are multiplexed according to the appropriate PID values. The routine 300 then proceeds to step 330, where the appropriate overlay is retrieved (i.e., the program guide object oriented emphasis overlay), and to step 308, where the audio and merged overlay and video streams are presented.

The above described user interaction routine provides an efficient method for user navigation within an interactive information distribution system. Specifically, the user manipulates on screen objects by selectively emphasizing or de-emphasizing those objects using a remote control device associated with the set top terminal. Within the program guide context objects are emphasized and de-emphasized and selected to retrieve desired video and/or audio streams. For example, in the case of the on screen display 100 of FIG. 1, a user may manipulate any of the objects and select a particular object to change the context of the program guide such that the user changes the level of abstraction by which information is presented.

Figure 4:
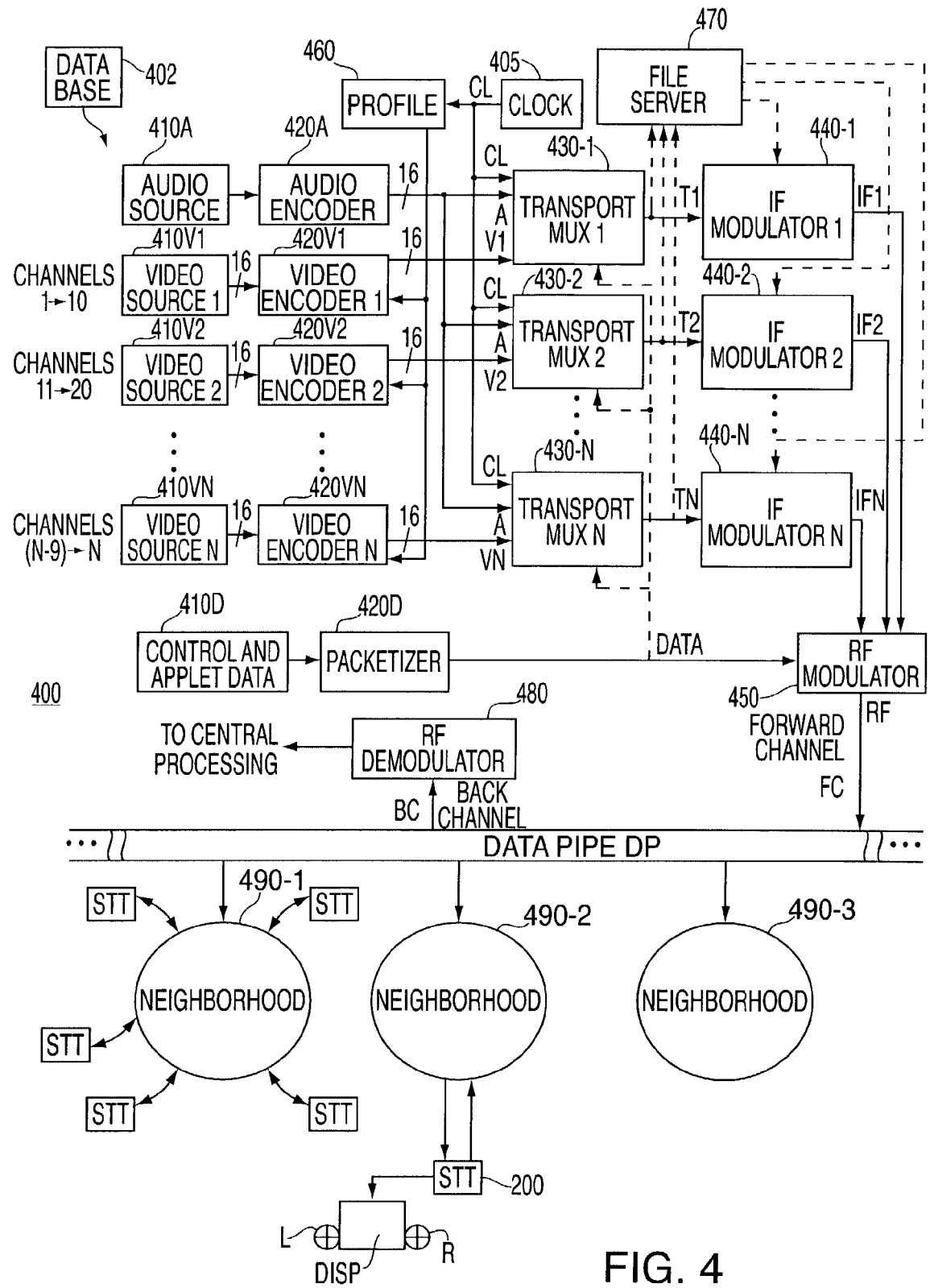
FIG. 4 depicts a high level block diagram of an interactive information distribution system.

FIG. 4 depicts a high level block diagram of an interactive information distribution system. Specifically, FIG. 4 depicts an interactive video information distribution system directed towards providing a plurality of video information streams and an associated audio information stream suitable for use in the interactive electronic program guide described above with respect to FIG. 1.

The head end processing portion 400 depicted in FIG. 4 comprises an audio source 410A, a plurality of video sources 410V1 through 410VN, an audio encoder 420A, a plurality of video encoders 420V1 through 420VN, a plurality of transport multiplexers 430-1 through 430-N, a plurality of intermediate frequency (IF) modulators 440-1 through 440-N, a radio frequency (RF) modulator 450, a video profile module 460, a file server 470, a clocking source 405, an RF demodulator 480. Audio source 410A provide an audio information stream, illustratively an audio information stream associated with the audio visual barker 120 of the interactive program guide display 100 of FIG. 1. The audio information stream is coupled to an audio encoder 420A, where it is encoded into a standard compressed audio format, such as Dolby AC3 or another appropriate format. The encoded audio stream A is coupled to each of the transport multiplexer units 430-1 through 430-N.

The first video source 410V1 provides, illustratively, 16 video information streams to video encoder 420V1. Each of the 16 video streams is suitable for providing the video information necessary to support the interactive program guide display 100 of FIG. 1. Specifically, it is noted that in the exemplary program guide 100 of FIG. 1 up to ten channels may be displayed at one time. Thus, each of the video information streams includes information sufficient to display a program guide screen comprising a 10 channel group of channels. In one embodiment of the invention, each of the 16 video streams coupled to the video encoder 420 comprises information sufficient to provide all video layer information for a single channel group, e.g., channels 1-10. In the case of only one of the 16 video streams being used, the output of the video encoder 420 comprises a single encoded video stream (which will be subsequently included in a single transport stream). In the case of more that one of the 16 video streams being used, the output of the video encoder 420 comprises more than one (up to 16) encoded video stream (all of which will be subsequently included in a single transport stream). It will be noted that 16 video streams represents 24 hours of programming for a single channel group.

All the generated streams are temporally aligned in terms of data (i.e., streams depicting different channels or different times are aligned such that stream to stream switching at a decoder may be accomplished in a substantially seamless manner. In addition, the streams are generated in a synchronized manner with respect to clock source 405, such that GOP structures, sequence headers, I-picture location and other parameters (which are indicated via the profile unit 460) are (if desired) aligned across a plurality of information streams. In this manner, stream splicing may be performed without noticeable video artifacts or audio artifacts, and without excessive latency.

A database 402 provides program guide information to a plurality of video sources 410V1 through 410VN. Each of the plurality of video sources 410V1 through 410VN is associated with, illustratively, ten channels (i.e., AMC, Fox, HBO and the like). Each of the ten channels provides different programming material at different times of the day as denoted by programming grid 150 in the interactive electronic program guide display 100 of FIG. 1. Specifically, since the displayed portion of the programming grid 150 comprises a 1.5 hour time interval, it is necessary to associate 16 (25 divided by 1.5) video streams with each ten channel block for each 24 hour period. That is, a first of the 16 video streams associated with the ten channel block is used to identify programming material from 12:00 a.m. through 1:30 a.m., a second stream is used to identify programming material from 1:30 a.m. through 3:00 a.m. and so on. Thus, video source 1 (410V1) provides 16 video information stream to video encoder 1 (420V1), wherein each of the 16 video information streams includes program identification information for channels 1-10 for each of the 16 1.5 hour time intervals. That is, each of the 16 video streams is capable of providing the video layer used in electronic program guide display 100 of FIG. 1 for a respective 1.5 hour time period.

Included within the program guide display 100 is, of course, the video barker 120. Associated with the video barker 120 is the audio stream A produced by audio source 410A and encoded by audio encoder 420A. The 16 video streams produced by video encoder 420V1, the audio stream produced by audio encoder 420A and a reference clock CL produced by a clock source 405 are coupled to a first transport multiplexer 430-1. Similarly, 16 video information streams representing 24 hours of programming data for channels 11 though 20 are produced by a second video source 410V2, and coupled to a second video encoder 420V2. The 16 encoded video streams V2 produced by second video encoder 420V2 are coupled to a second transport multiplexer 430-2 along with the audio stream A and clock stream CL. Similarly, the Nth video source 410VA produces 16 video information streams associated with a 24 hour programming period for the N-9 through Nth channels in the system. The 16 video information streams produced by the Nth video stream 410VN are coupled to an Nth video encoder 420VN where they are encoded. The Nth group of 16 encoded video information streams VN is then coupled to an Nth transport multiplexer 430-N, along with the audio stream A produced by audio encoder 420A and the clock signal CL produced by clock source 405.

Each of the transport multiplexers 430-1 through 430-N produces a respective output transport stream T1 through TN that is coupled to a respective intermediate frequency (IF) modulator 440-1 through 440-N. Optionally, the transport streams T1 through TN are coupled to file server 470 for storage prior to subsequent delivery to the respective IF modulators 440-1 through 440-N. The IF modulators 440-1 through 440-N produce respective IF output signals which are then coupled to RF modulator 450. The RF modulator 450 modulates the respective IF signals onto a carrier frequency for subsequent transmission via a forward channel.

It is important to note that, while the transport multiplexing function is depicted as being performed by a plurality of transport multiplexers 430-1 through 430-N, the transport multiplexing function may also be performed using a single transport multiplexer. Additionally, while the IF modulation function is depicted as being performed by a plurality of IF modulators 440-1 through 440-N, the IF modulation function may also be performed using a single IF modulator. The main constraint placed upon the IF modulation function relates to the available bandwidth within the forward channel FC. That is, since each IF modulated signal IF1 through IF-N is capable of carrying data at a maximum bitrate (e.g., 27 Mbps in a 64 QAM modulation scheme), the total data rate of the transport stream(s) within the IF modulated signal cannot exceed the available bandwidth. Thus, in the case very high data rate streams are transport encoded, it may be necessary to use several IF modulators to produce a corresponding several IF modulated signals for transmission via the forward channel FC.

A control and applet source 410D provides control information and applet data information (i.e., subscriber side programs provided by the server) to a packetizer 420D, illustratively an MPEG2 packetizer producing an auxiliary data stream then DATA. The auxiliary data stream DATA is coupled to RF modulator 450 and, optionally, each of the transport multiplexers 430-1 through 430-N. In the case of the auxiliary data stream DATA being coupled to each of the transport multiplexers, the resulting multiplexed transport streams T1 through TN will each include the control and applet data such that retrieval of any one of the multiplexed transport streams from the forward channel by a set top terminal will yield control data and applet data sufficient to run any appropriate subscriber side programs.

The RF modulated data is coupled to a forward channel within e.g., a cable television system or other information distribution system. The information distribution system is denoted as data pipe DP and is coupled to a plurality of neighborhood information distribution systems 490-1 through 490-3. Each of the neighborhood distribution systems 490-1 through 490-3 is coupled to a plurality of set top terminals 200. It should be noted that while each of the set top terminals is denoted by the same reference designator (i.e., 200), that each of these terminals will be associated with a unique terminal identification (TID) and other subscriber specific information. The set top terminal 200 described above with respect to FIG. 2 may be used within the system of FIG. 4. Furthermore, each set top terminal is associated with a display device (i.e., a television or other display device) and an audio presentation unit (i.e., speakers and associated speaker drivers). The display device and speakers are denoted by the DISP, L and R designators.

Figure 5:
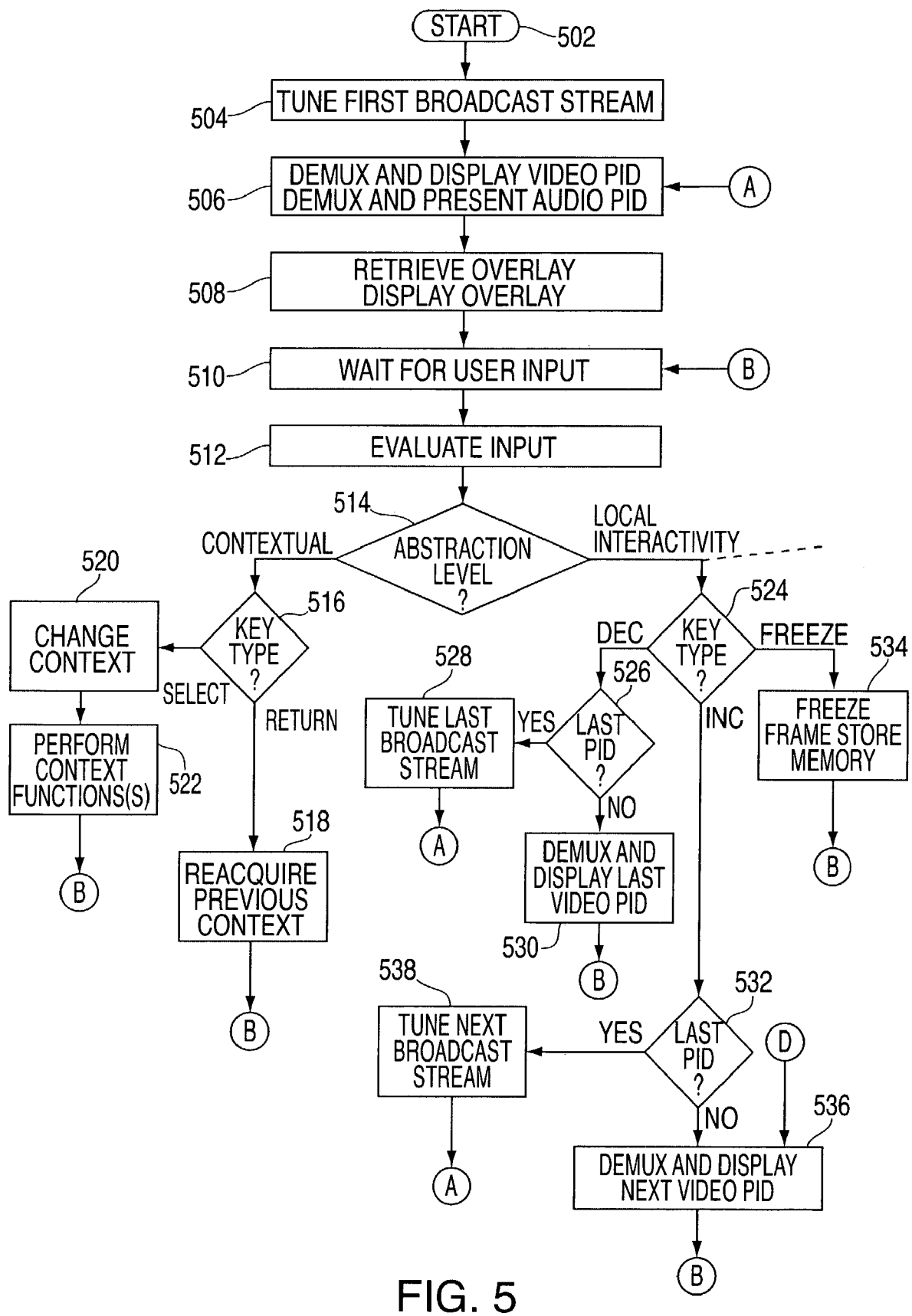
FIG. 5 depicts a flow diagram of a user interaction routine suitable for use in a subscriber side equipment of FIG. 2.

FIG. 5 depicts a user interaction routine 500 according to the invention. The routine 500 is entered at step 502, when subscriber side equipment is initially powered on or otherwise initialized. The routine 500 then proceeds to step 504, where a first or default stream is tuned and demodulated. The routine 500 then proceeds to step 506, where a first four default video stream and associated audio stream is demultiplexed and displayed or presented. The routine 500 then proceeds to step 508, where an appropriate overlay is retrieved and displayed along with the displayed or presented video stream. The routine 500 then proceeds to step 510, where the processor waits for user input via, e.g., remote control device 280.

Upon receipt of user input, the routine proceeds to step 512, where the user input is evaluated. The routine 500 then proceeds to step 514, where a query is made as to whether the evaluation indicates that the abstraction level indicated by the user input is contextual or local interactivity.

If the query at step 514 indicates that the user interaction is such that the contextual level of the interactive experience is to be changed, then the routine proceeds to step 516. At step 516 a query is made as to which key has been pressed by the user. If the query at step 516 indicates that the return key has been pressed, then the routine 500 proceeds to step 518, where the previous context is re-acquired. That is, in the case of a present pointcast context such as a interactive shopping or pay per view context, activation of a return key on a remote control device that a return to the previous context is required, which would typically mean that return to the program guide context is desired. The routine 500 then proceeds to step 510, where the processor waits for user input.

If the query at step 516 indicates that the key pressed was the select key, then the routine proceeds to step 520, where the context is changed in response to the emphasized object selected by the select key. The routine 500 then proceeds to step 522, where the selected context function or functions are performed. The routine then proceeds to step 510, where the processor waits for user input.

If the query at step 514 indicates that local interactivity only is requested by the user, then the routine proceeds to step 524, where a query is made as to the type of key pressed by the user. If the query at step 524 indicates that a freeze key has been pressed by the user, then the routine proceeds to step 534, where the video frame presently stored in frame store unit 262 is frozen. That is, the frame store unit 262 is not updated by subsequent video frames until such time as a freeze key or other key is pressed again. The routine 500 then proceeds to step 510, where the processor waits for user input. If the query at step 524 indicates that an increment key has been pressed (e.g., a temporal increment or channel increment) then the routine proceeds to step 532. At step 532 a query is made as to whether the next video stream has indicated by the PID of the stream is in fact the last video stream within a particular broadcast stream. If the query at step 532 is answered affirmatively, then the routine 500 proceeds to step 538, where the next broadcast stream is tuned. The routine 500 then proceeds to step 506, where the first video and associated audio streams are demultiplexed and displayed or presented.

If the query at step 532 is answered negatively, then the routine 500 then proceeds to step 536, where the next video stream (i.e., the next video PID) is demultiplexed and displayed. The routine 500 then proceeds to step 510, where the processor waits for user input.

If the query at step 524 indicates that a decrement key was pressed (i.e., a temporal or channel identification decrement), then the routine 500 proceeds to step 526, where a query is made as to whether the presently selected video stream as indicated by the PID of the stream is, in fact, the last video stream in the presently tuned broadcast stream. If the query at step 526 is answered affirmatively, then the routine 500 proceeds to step 528, where the previous broadcast stream associated with the decrement key, i.e., the previous broadcast stream including the temporal and/or channel information) is tuned. The routine 500 then proceeds to step 506. If the query at step 520 is answered negatively, then the previous video stream associated with the appropriate parameter (i.e., temporal or channel parameter) is demultiplexed and displayed along with the associated overlay. The routine 500 then proceeds to step 510, where the processor waits for user input.

A critical aspect of the present invention is the isolation of the interaction model at the set-top box level, where no context is associated with any user interaction, and where merely the manipulation of audio and visual elements representing applying removing and shifting emphasis from one area or another. All items containing contextual information will reside in a centralized location where they will be processed and the management of network resources executed in manner to enable the request context-based service request or transition.

This invention works by combining the use of broadcast digital video streams with video-on-demand streams to produce a compelling user interface in both visual and audio terms. The invention uses an intelligent set top boxes ability to manipulate a graphics overlay plane displayed in conjunction with a video image on an intelligent analog or digital set top box. The system allows the interactions to carry the user from broadcast (or narrowcast) video stream to broadcast (or narrowcast) video stream, from broadcast (or narrowcast) video stream to pointcast video stream, and from pointcast video stream to broadcast (or narrowcast) video stream.

At the heart of the interactive program guide is a method that takes the time-dependent information and provides that in streaming mode over a series of synchronized real-time video streams. The user of the guide agilely moves between these broadcast streams to receive the full set of available listings. When the user's interest takes him/her from the domain of time-dependent information such as a listing of currently available programming to the realm of time-independent information such as previews, promos, or the like, the streams processed at the set top box transition from broadcast to pointcast (on-demand) streams.

When the user's interest takes him/her from one area of time-independent information back to an area of time-dependent information, the streams requested by the system and processed at the set top box will shift from one pointcast stream to a broadcast stream. For example, when a user returns to the program guide from an interactive shopping channel or pay per view event the video stream served to the user changes from a pointcast stream to a broadcast stream.

The user of the exemplary interactive program guide controls the logical operation of shifting the emphasis from one "object" to the next through the use of an interactive device such as a remote control with directional arrows, a joystick or other interactive controller. Such an approach may be used with or without an on-screen pointer or cursor. When the user makes a selection to a single option the tuner in the set top box may be force-tuned to the corresponding selection.

Traversal of the available options in a long list of programming options is achieved by providing the option to page through the various sets of options. This effect is achieved by jumping from one video stream (by changing from one PID to another within the same or different QAM channel). The advantage of jumping within the same QAM channel is that there will not be any noticeable added latency associated with tuning to the new analog channel.

It is important to note that synchronization of program channel numbers with areas of on-screen emphasis is achieved through either in-band data delivery, out-of-band data delivery, vertical blanking interval (VBI) data delivery or other approaches known to those familiar in the art of data delivery in broadband networks. That is, data indicative of the location of manipulable screen objects (i.e., those objects that may be selectively emphasized) is provided to the set top terminal via one or more techniques.

Channel options in the Interactive Program Guide can represent any combination of programming offered from a wide range of sources, including but not limited to, over-the-air broadcast, cable broadcast, satellite broadcast, local programming, ad insertion apparatus and can include the full range of pay channels, pay per view, video on demand, near video on demand, internet service, interactive gaming, interactive shopping, free programming, etc. Channel numbers can be virtual in nature, and they can be remapped in either the set top box or the head end equipment to correspond to the service being delivered.

Delivery of PPV, NVOD, VOD, interactive gaming, interactive shopping, internet, video classified ads, and other services can be integrated into this system in a two-way cable environment through the use of cable modem technologies or other back-channel methods known to those familiar in the art of enabling such services in a network environment.

This invention may further be used to enable pay television services such as subscription services like HBO®, Showtime®, etc., in a two-way cable environment through the use of cable modem technologies or other back-channel methods known to those familiar in the art of enabling such services in a network environment.

This system can further be extended to implement conditional access by arranging bitmap information in different data blocks according to types of access allowed. Processing of this information would be done at the head end where a series of descriptors are developed for each on-screen area capable of receiving emphasis. Part of the descriptors contain entitlement "locks" mapping access entitlement to on-screen areas capable of displaying emphasis. At the set top box, a series of "keys" exist that map to those channels the user is entitled to view. If one of the keys "fits" any of the locks, the bitmap set linked to the key may receive on-screen emphasis at the set top box.

The invention is unique because, advantageously, it does not require the maintenance of television programming lists in the set top box, it adds a level of interactivity to current broadcast programming guides, it provides a more television-like user experience, and it makes the best economic use of bandwidth in intricate, asset-rich interactive program guides.

In one embodiment of the invention, multiplexed broadcast analog or digital video and static, pre-programmed bitmaps are utilized. In this embodiment, the pre-programmed bitmaps are installed in the set top box in, e.g., memory module 276. The bitmaps are x-y grid borders that align with x-y grid borders built into the broadcast video streams, and are modified in color and/or degree of transparency to allow visual emphasis to be associated with a single option or set of options.

In another embodiment of the invention, multiplexed broadcast analog or digital video and dynamic, pre-programmed bitmaps are utilized. In this embodiment, a variety of pre-programmed bitmaps are installed in the set top box. These bitmaps may be x-y grid borders, circles, or any other delineator capable of providing adequate emphasis so that a user may discern the option of set of options representing an actionable field. These may align with borders built into the broadcast video streams and are modified in color and/or degree of transparency to allow visual emphasis to be associated with a single option or set of options. The set top box can move back and forth between one set of bitmaps and another. Synchronization of a particular set of installed bitmaps to a broadcast video stream is achieved through signaling linked to the broadcast video stream either through in-band data delivery, out-of-band data delivery, vertical blanking interval data delivery or other approaches known to those familiar in the art of data delivery in broadband networks.

In another embodiment of the invention, multiplexed broadcast analog or digital video and dynamic, updateable bitmaps are used. In this embodiment, a variety of pre-programmed bitmaps may or may not be installed in the set top box. As in the previous embodiment, these bitmaps may be x-y grid borders, circles, or any other delineator capable of providing adequate emphasis so that a user may discern the option of set or options representing an actionable field. These may align with borders built into the broadcast video streams and are modified in color and/or degree of transparency to allow visual emphasis to be associated with a single option or set of options. The set top box can move back and forth between one set of bitmaps and another. Synchronization of a particular set of installed bitmaps to a broadcast video stream and download of new bitmaps is achieved through signaling linked to the broadcast video stream either through in-band data delivery, out-of-band data delivery, vertical blanking interval data delivery or other approaches known to those familiar in the art of data delivery in broadband networks.

In one embodiment of the invention a set top box focus method is described for transitioning from stream to stream without interruption in signal or contextual continuity with parallel information streams in an interactive information on demand environment. Specifically, referring to FIG. 4 a high level block diagram depicting formation and distribution of a plurality of related information streams is shown. Specifically, the related information streams comprise a single audio information stream and a plurality of video information streams. Each video information stream comprises image information such as the image information depicted in the interactive electronic program guide display 100 of FIG. 1. However, each video stream is associated with different channels as identified in the channel grid 150, channel identification 135 and channel number 130 objects in the display 100 of FIG. 1.

In one embodiment of the invention, text information is integrated into video streams to provide a video-based, remote cast interactive program guide. That is, text information is included within the downstream video portion as part of the onscreen program guide. This text information may comprise, e.g., stock quotes and other information.

In another embodiment of the invention, profiling data is produced by transport demultiplexer 230. Specifically, transport demultiplexer 230 produces data indicative of GOP structure, sequence header locations, I-picture locations, PID identifications, and other information included in the broadcast streams and/or video and audio streams included within that broadcast stream.

In another embodiment of the invention, a system and method for advertisement insertion into point cast and narrowcast digital distribution systems is disclosed. Specifically, advertisements appropriate to a particular subscriber or a group of subscribers in, e.g., a neighborhood, are inserted into point cast or narrowcast digital video streams going to that subscriber or neighborhood of subscribers.

In another embodiment of the invention, a system and method for invoking an information stream using a video-based, remote-cast interactive program guide in an interactive information-on-demand system is disclosed. That is, in this embodiment of the invention.

In another embodiment of the invention, a method and apparatus for processing conditional access information for a video-based, remote cast interactive program guide is disclosed. Also disclosed is a method and apparatus for merging multiple sources of scheduled and on-demand programming for a video-based, remote cast interactive programming guide. Additionally disclosed is a system and method for inserting advertisements into an interactive program guide based on user profiles (i.e., demographic profiles). These demographic profiles are also useful in targeting, in either point cast or narrowcast streams, advertising material for a particular subscriber or a group of subscribers. Also disclosed is a method and apparatus for blending sub-elements of independent MPEG streams to make a single unified MPEG stream (also known as slice level splicing). In this embodiment, particular elements of the onscreen program display are associated with particular slices. That is, a slice comprises one or more contiguous blocks within a single row of macroblocks. The first block of a line is always the first block of a slice, the last block of a line is always the last block of a slice. A line may comprise a single slice or multiple slices. By forming the onscreen display according to a slice-based regional approach, slice level splicing may be performed at a subscriber end by, e.g., controller 270 adaptively coupling slices from one or more information streams to an output.

Also disclosed is a method and apparatus for the generation of rewind tracks for MPEG in near real time. That is, the head end processing system may include, in addition to standard (i.e., forward) video information streams, additional information streams comprising a temporally reversed information stream. This temporally reversed information stream need not be transmitted contemporaneous to the forward information stream. Rather, portions of the rewind information stream may be transmitted such that a slicing operation between the streams may result in a stream switching without excessive latency, while at the same time the rewind track is acquired rapidly and provided to the output.

Figure 6:
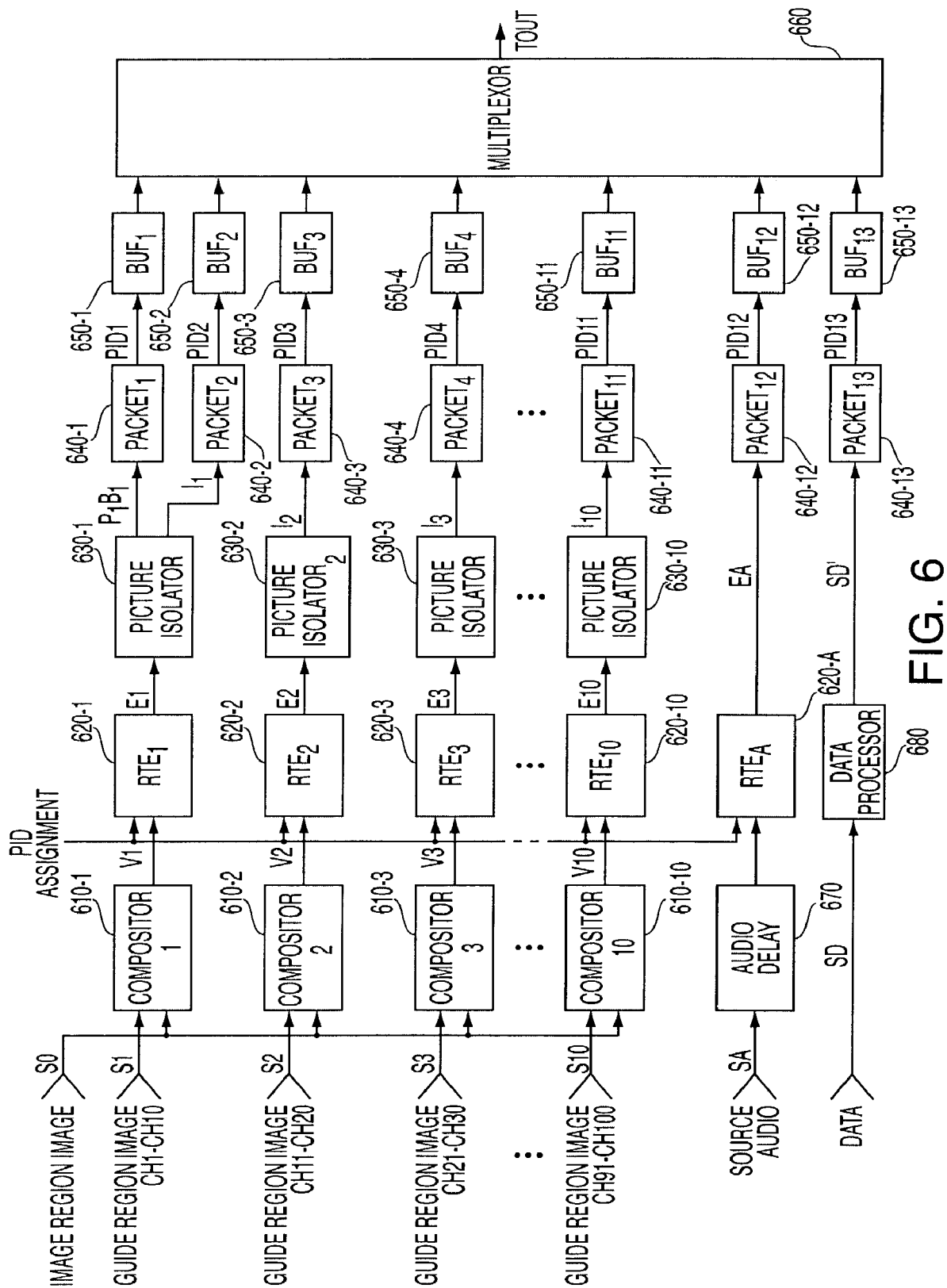
FIG. 6 depicts a high level block diagram of an information processing apparatus.

FIG. 6 depicts a high level block diagram of an information processing apparatus. Specifically, FIG. 6 depicts a high level block diagram of an apparatus 600 suitable for producing a transport stream comprising a plurality of video elementary streams wherein a image portion common to each of the plurality of elementary streams is transported using a single elementary stream.

The information processing apparatus 600 of FIG. 6 is used to form a data structure comprising a transport stream including a plurality of video streams representing respective first portions of a group of pictures (GOP) information structure, where each of the respective first portions include an I-picture. The transport stream also includes a video stream representing a remaining portion of the GOP information structure including at least one of a P-picture and a B-picture. Utilizing this data structure, the concatenation of any one of the respective first portions of the GOP information structure and the second portion of the GOP structure results in a complete GOP information structure. By utilizing a data structure of this type, significant bandwidth savings may be realized within an information distribution providing information.

It is important to note that the invention is applicable to both open and closed GOP structures. Moreover, the teachings of the present invention may be applied to a broad range of applications, such as broadcast video delivery, internet video delivery, satellite imagery and the like.

The invention will be described within the context of a data structure that is used to provide imagery for a plurality of image screens, illustratively interactive program guide display screens. Each of the plurality of image screens includes imagery common to all of the plurality of image screens, illustratively a video barker, and imagery not common to all of said plurality of image screens, illustratively a channel guide. In this embodiment, the respective first portions of the GOP structure included both common and non-common screen imagery, while the second portion of the GOP structure include at least common screen imagery. Thus, in the case of a video distribution system including, illustratively, a broadcast, narrowcast or pointcast program guide having such common and non-common imagery, significant bandwidth savings are realized.

The apparatus 600 depicted in FIG. 6 receives a plurality of image signals S0-S10 and, optionally, one or both of a audio signal SA and a data signal SD.

The first image signal S0 comprises imagery common to a plurality of image frames, such as an image region of the interactive electronic program guide display screen 100 depicted above with respect to FIG. 1. That is, the first image signal S0 represents image information that is common to each of a plurality of EPG display screens, namely the video barker 120 of the interactive program guide of display 100 of FIG. 1.

Each of the remaining image signals S1-S10 comprise respective imagery that is not common to each of the plurality of image frames, such as guide regions of respective interactive electronic program guide display screens 100 depicted above with respect to FIG. 1. That is, the remaining image signals S1-S10 represent image information that is not common to each of the plurality of EPG display screens, namely the program guide and other non-video barker objects of the interactive program guide of display 100 of FIG. 1.

Specifically, "guide region" image signal S1 represents all the image information, except the video barker 120, of a interactive program guide display 100 providing channel information for channels 1-10. Similarly, guide region image stream S2 provides all the image information, except the video barker 120, of a interactive program guide display 100 displaying channel information for channels 11-20. Finally, guide region image streams S3-S1 provide all of the image information for, respectively, interactive program guide displays 100 showing guide region information for channels 21-30 (S3), 31-40 (S4), 41-50 (S5), 51-60 (S6), 61-70 (S7), 71-80 (S8), 81-90 (S9) and 91-100 (S10). It is noted that it is preferable for the remaining video streams S1-S10 to carry only non-moving imagery. In this manner, the bandwidth resource savings will be maximized due to the avoidance of forward and bi-directionally predicted macroblocks outside of the image region of the interactive program guide display 100.

The audio signal SA comprises, illustratively, audio information for the audio barker that is associated with the video barker 120. That is, the audio information SA comprises an audio track that is associated with the still or moving images provided by the first image stream S0. For example, in the case of image stream S0 representing a movie trailer, the audio stream SA is derived from the source audio (e.g., music and voice-over) associated with the music trailer.

The data stream SD comprises, illustratively, overlay graphics information such as described above with respect to FIG. 1, textual information description described through titles of programming indicated by the guide region image streams S1 through S10 and other data. It must be noted that while data stream SD is indicated as being separately encoded into its own elementary stream, it will be appreciated by those skilled in the art that data stream SD may be included by private data, auxiliary data or other types of data according to the MPEG-2 standard or other standards suitable for use in the information distribution system of FIG. 4.

The exemplary apparatus of FIG. 6 comprises a plurality (illustratively 10) of compositors 610-1 through 610-10 (collectively compositors 610), a corresponding plurality of real time MPEG-2 encoders 620-1 through 620-10 (collectively encoders 620), a corresponding plurality of frame isolators 630-1 through 630-10 (collectively frame isolators 630), a plurality of packetizers 640-1 through 640-13 (collectively packetizers 640), a plurality of buffers 650-1 through 650-13 (collectively buffers 650), a transport multiplexer 660, an audio delay element 670, an optional data processor 680.

The first image stream S0 is coupled to a first input of each of the compositors 610. In addition, a respective one of the remaining image streams S1-S10 is coupled to a second input of each of the compositors 610. In response, each of the compositors 610 produces a respective composited output stream (V1-V10) comprising the still or moving imagery of the first image stream S0 overlayed onto the, preferably, non-moving imagery of the respective remaining image stream S1-S10.

For example, in the case of compositor 1 (610-1), the image regions image signal S0 forms an image signal which, when displayed, occupies only that portion of a display corresponding to the portion of the interactive program guide display 100 corresponding to the video barker 120. That is, a first compositor 610-1 produces an output video signal V1 comprising the image information from guide region image signal S1 and the image information from image region image signal S0.

In one embodiment of the invention providing an the interactive program guide display, the guide region image information of signal S1 comprises the static image information surrounding the video barker 120 of the program guide display 100 of FIG. 1, while the image region image signal S0 comprises the image information forming the video barker 120 of the interactive program guide display 100 of FIG. 1. In another embodiment of the invention, the display screen is cut into two portions along macroblock boundary lines. In all embodiments, it is preferable to divide a display screen along macroblock boundary lines.

The output signals V1-V10 produced by the respective compositors 610 are coupled to respective real time encoders 620. Each encoder 620 encodes, illustratively, a composited IPG screen sequence to form a corresponding compressed video bit stream, e.g., an MPEG-2 compliant bit stream having associated with it a predefined group of pictures (GOP) structure. For purposes of this discussion, it will be assumed that the GOP structure comprises an I-picture followed by ten B-pictures, where a P-picture separates each group of two B-pictures (i.e., "I-B-B-P-B-B-P-B-B-P-B-B-P-B-B"). It will be known to those skilled in the art that any GOP structure may be used. Moreover, the invention operates using a closed GOP structure (i.e., no predictions using anchor frames outside of a GOP) or an open GOP structure. It is preferable that the GOP structure selected is uniformly used by each of the real time encoders 620. In this manner, the relative size of I-pictures produced by real time encoders will be roughly the same between encoders. Moreover, by utilizing a predefined GOP structure, multiple instances of the same encoder are used to realize the apparatus 600 of FIG. 6, thereby driving down costs.

Each of the real time encoders 620 produces a respective output signal comprising an encoded MPEG-2 bit stream (E1-E10) that is coupled to a respective frame isolator 630. The operation of the frame isolators 630 will be described in more detail below with respect to FIG. 7. Briefly, each of the frame isolators 630 examines the received encoded video stream for the purpose of isolating I-pictures within the MPEG2 compliant bitstreams E1-E10. More particularly, the frame isolators process the received encoded bitstreams to identify which access units are associated with I-, P- and B-pictures.

The first frame isolator 630-1 receives the MPEG-2 compliant bitstream E1 from the first real time encoder 620-1 and responsively produces two output bit streams P1B1 and I1.

The frame isolators 630 process the received bitstreams E1-E10 according to the type of picture (I-, P- or B-picture) associated with a particular access unit. As noted in the MPEG specification, an access unit comprises a coded representation of a presentation unit. In the case of audio, an access unit is the coded representation of an audio frame. In the case of video, an access unit includes all the coded data for a picture and any stuffing that follows it, up to but not including the start of the next access unit. If a picture is not preceded by a group start code or a sequence header code, the access unit begins with the picture start code. If a picture is preceded by a group start code and/or a sequence header code (e.g., an I-picture), the access unit begins with the first byte of the first of the start codes. If it is the last picture preceding a sequence end code in the bitstream all bytes between the last byte of the coded picture and the sequence end code (including the sequence end code) belong to the access unit. Thus, a GOP structure comprising a sequence header followed by a group start code and a picture start code of an I-picture initiating a GOP comprises the information within an access unit representing the initial I-picture of the GOP. Each of the B- and P-pictures filling out the remaining portions of the GOP comprise respective access units, each access unit comprising a picture start code. The last access unit of the GOP (e.g., a termination B-picture) comprises a picture start code followed by encoded video information representative of the B-picture and a sequence end code indicating the termination of the GOP. In the case of a closed GOP structure, the pictures within the GOP do not rely on reference information outside of the GOP. That is, the pictures within the GOP requiring reference information do not use reference information except from anchor frames within the GOP. Thus, in the case of the GOP structure terminating with one or more B-frames, each of the terminating one or more B-frames utilizes reference information only from the preceding anchor frame within the GOP (e.g., a preceding P-frame or I-frame).

The I1 bitstream comprises only I-picture access units, specifically the sequence header and all data until the second frame or picture start code (i.e., the access unit data associated with the I-picture at the beginning of the GOP). Since the first frame or picture of the MPEG2 compliant bitstream comprises an I-picture, the I1 output stream comprises a sequence header of the GOP, a GOP start header, a frame start code of the first frame (the I-picture) and all the data up to, but not including, the second frame start code. Therefore the I1 stream comprises all access units of the GOP structure representing the I-picture. By contrast, the P1B1 stream comprises only P- and B-picture access units, specifically the second frame start code (a B-picture) and all data up until the next sequence header. Therefore the P1B1 stream comprises all access units of the GOP structure excluding those representing the I-picture.

Each of the second 630-2 through tenth 630-10 frame isolators receive, respectively, the MPEG-2 compliant bitstreams E2 through E10 from the corresponding real time encoders 620-2 through 620-10. Each of the second 630-2 through tenth 630-10 frame isolators responsively produce one respective output stream I1-I10 comprising only the sequence header and all data until the respective second frame start codes (i.e., the access unit data associated with the I-picture at the beginning of the respective GOP).

The first packetizer 640-1 packetizes the P1B1 stream into a plurality of fixed length transport packets according to, e.g., the MPEG-2 standard. Additionally, the first packetizer 640-1 assigns a packet identification (PID) of one to each of the packets representing information from the P1B1 stream, thereby producing a packetized stream PID1. The second packetizer 640-2 packetizes the I1 stream to produce a corresponding packetized stream PID2.

The P1B1 stream produced by the first frame isolator 630-1 is coupled to a first packetizer 640-1. The I1 stream produced by the first frame isolator 631 is coupled to a second packetizer 640-2. The I2 through I10 output streams of the second 630-2 through tenth 630-10 frame isolators are coupled to, respectively, third 640-3 through eleventh 640-11 transport packetizers, which produce respective packetized streams PID3-PID11.

Each of the transport packetized streams PID1-PID011 is coupled to a respective buffer 650-1 through 650-611, which is in turn coupled to a respective input of the multiplexer 660, illustratively an MPEG-2 transport multiplexer. While any type of multiplexer will suffice to practice the invention, the operation of the invention will be described within the context of an MPEG-2 transport multiplexing system.

A transport stream, as defined in ISO standard 13818-1 (commonly known as MPEG2 systems specification), is a sequence of equal sized packets, each 188 bytes in length. Each packet has a 4 byte header and 184 bytes of data. The header contains a number of fields, of which the one I'm concerned at the moment is "packet identifier" or "program identifier" (known as a PID). The PIC field contains 13 bits and uniquely identifies each packet that contains a portion of a "stream" of video information as well as audio information and data. As such, to decode a particular video bitstream (or audio bitstream or data) for viewing or presentation, the decoder in the subscriber or user equipment extracts packets containing a particular PID and decodes those packets to create the video (and audio ) for viewing or presenting.

Each of the 13 bitstreams representing the IPG page sequence are uniquely identified by a PID. In the preferred embodiment the 13 bitstreams are multiplexed into a single transport stream. Of course, less or more IPG bitstreams may be included in the transport stream as bandwidth permits. Additionally, more than one transport stream can be used to transmit the IPG bitstreams. The IPG grid foreground and overlay graphic graphics data is also coupled to the transport multiplexer 660 as a data stream having a PID or 13 (PID13). The data stream is produced by processing the data signal SD as appropriate to the application using the data processor 680 and packetizing the processed data stream SD' using the thirteenth packetizer 640-13 to produce the PID13 signal, which is coupled to the thirteenth buffer 650-13.

In addition to the video information forming the ten IPG screens, audio information associated with the image region or video barker 120 of the IPG screens is also encoded and supplied to the transport multiplexer 660. Specifically, the source audio signal is subjected to an audio delay 670 and then encoded by a real time audio encoder 620-A, illustratively a Dolby AC-3 real time encoder to produce an encoded audio stream EA. The encoded stream EA is packetized by a 12 transport packetized 640-12 to produce a transport stream having a PID of 12 (PID12). The PID12 transport stream is coupled to a $12^{th}$ buffer 650-12.

Multiplexer 660 processes the packetized data stored in each of the 13 buffers 650-1 through 650-13 in a round robin basis, beginning with the $13^{th}$ buffer 650-13 and concluding with the first buffer 650-1. That is, the transport multiplexer 660 retrieves or "drains" the PID 13 information stored within the $13^{th}$ buffer 650-13 and couples that information to the multiplexer 660 as part of the output stream TOUT. Next, the $12^{th}$ buffer 650-12 is emptied of packetized data which is then coupled to the output stream TOUT. Next, the $11^{th}$ buffer 650-11 is emptied of packetized data which is then coupled to the output stream TOUT and so on until the $1^{st}$ buffer 650-1 is emptied of packetized data which is then coupled to the output stream TOUT. It is important to note that the processing flow is synchronized such that each output buffer includes all the access units associated with an I-picture (650-2 through 650-11) suitable for anchoring a GOP, a particular group of P- and B-pictures (650-1) suitable for filling out the rest of the GOP, a particular one (or more) audio access units (650-12) and an appropriate amount of data (650-13). The round robin draining process is repeated for each buffer, which has been filled in the interim by new transport packetized streams PID13-PID1.

FIG. 8 depicts a data structure 800 produced by the information processing apparatus 600 of FIG. 6. Specifically, the data structure 800 of FIG. 8 comprises an MPEG2 compliant transport stream comprising non-compliant video information and, optionally, audio information and data. Specifically, the data structure 800 comprises an MPEG2 compliant transport stream comprising a first plurality of transport packets 801 associated with data information having a PID of 13, a second plurality of transport packets 802 comprising audio information and having a PID of 12, a third plurality of transport packets 803 having associated with it a PID of 11 and comprising a sequence header, a frame start code and the packetized information representing the $10^{th}$ I-picture (i.e., the I-picture representing guide region image signal S10).

The data structure 800 of FIG. 8 comprises 25 respective pluralities of transport packets (801-825) representing the data of PID13 (801), the audio information of PID12 (802), each of the ten I-pictures associated with, respectfully, guide region image streams S10-S1 (803-812), and the B-pictures and P-pictures associated with the first guide region image stream S1 (813-825).

Figure 7:
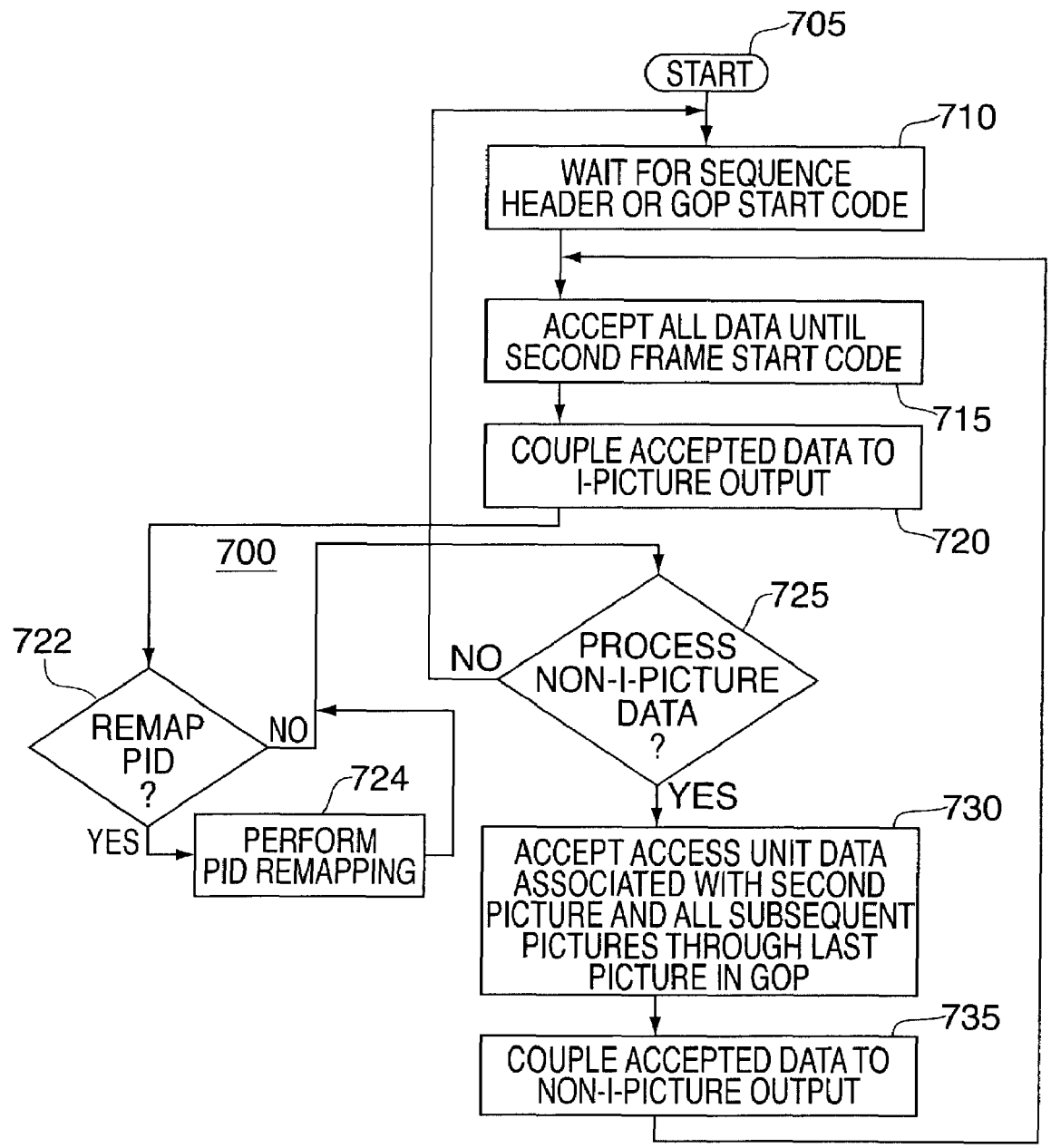
FIG. 7 depicts methods for isolating information frames suitable for use in the information processing apparatus of FIG. 6.

FIG. 7 depicts a method for isolating information frames suitable for use in the information processing apparatus of FIG. 6. Specifically, FIG. 7 depicts a method 700 suitable for use in the frame isolators 630 of the apparatus 600 of FIG. 6.

The frame isolator method 700 is entered at step 705 and proceeds to step 710, where it waits for a sequence header. Upon detection of a sequence header, the method 700 proceeds to step 715.

At step 715 the sequence header and all data up until the second frame start code is accepted. That is, the frame isolator 630 accepts the sequence header and all data up until, but not including, the second frame start code. The method 700 then proceeds to step 720.

At step 720 the accepted data is coupled to the I-picture output of the frame isolator. In the case of frame isolators 630-2 through 630-10, since there is no PB output shown, the accepted data (i.e., the sequence header, I-picture start code and I-picture) is coupled to the sole output. The method 700 then proceeds to step 725.

Prior to proceeding from step 720 to step 725, a determination may be made at step 722 regarding whether to perform PID remapping. If it is determined at step 722 not to remap, then method 700 proceeds to step 725. Otherwise, if it is determined at step 722 to remap, then PID remapping is performed at step 724, after which method 700 proceeds to step 725. PID remapping is needed owing to V1 being split into two packetized streams.

At step 725 a query is made as to whether non-I-picture data is to be processed. That is, a query is made as to whether non-I-picture data is to be discarded or coupled to a packetizer. If the query at step 725 is answered negatively, non I-picture data is discarded or coupled to a packetizer. If the query at step 725 is answered negatively (non-I-picture data is discarded) then the method 700 proceeds to step 710 to wait for the next sequence header. If the query at step 725 is answered affirmatively, then the method 700 proceeds to step 730.

At step 730 the second frame start code and all data up until and not including the next sequence header is accepted. That is, the remaining data within a GOP is accepted. The method 700 then proceeds to step 735.

At step 735 the accepted data is coupled to the non-I-picture output of the frame isolator 630.

Thus, the frame isolator method 700 of FIG. 7 examines the compressed video stream produced by the real time encoder 620 to identify the start of a GOP (sequence header), the start of an I-picture (first frame start code after the sequence header) and the start of a plurality of non-I-pictures (second frame start code after the sequence header) forming the remainder of the GOP. The frame isolator routine causes the I-picture and non-I-pictures to be coupled to respective outputs for further processing in conformance with the invention.

FIG. 9 depicts a method for processing the data structure described in FIG. 8 that is suitable for use in the subscriber side equipment of FIG. 1.

As previously noted with respect to FIGS. 1 and 2, a single interactive program guide display comprises video information from a single video PID coupled with audio information from an audio PID within a received transport stream. Utilizing the apparatus of FIG. 6 and the method of FIG. 7, a transport stream received by a set top terminal (such as depicted in FIG. 2) is formed according to the data structure 800 of FIG. 8. It must be noted that the data structure 800 of FIG. 8, while comprising a compliant MPEG2 transport stream, does not comprise compliant MPEG2 video elementary streams. Specifically, none of the video elementary streams 1-11 form an entire GOP. It is noted that the video stream associated with PID1 comprises only non-I-picture data (i.e., P-picture and B-pictures of a GOP) while the video streams associated with page 2-11 comprise, respectively, I-picture data associated with guide region image streams S1-S10. To process such a data structure, the subscriber equipment of FIG. 2 selects a desired I-picture according to its PID value and, upon detecting a change in PID value, concatenates the information within the video stream identified by PID1.

The method 900 of FIG. 9 is entered at step 905 and proceeds to step 910, where the PID of a desired I-picture is awaited. That is, each of the, illustratively, ten different I-pictures is associated with a respective PID. In the case of a subscriber wishing to view the channel guide screen associated with channels 11 through channel 20 (i.e., guide region image S2, image region image stream S0 and the associated audio stream SA), the PID of the desired I-picture is 3. Thus, the method 900 utilizes the transport demultiplexer 230 of the subscriber equipment 200 to identify the PID associated with each of the received transport stream packets. Upon detecting a transport packing having the appropriate PID (illustratively, PID 3) the method 900 proceeds to step 915.

At step 915 the packets of the PID of the access unit including the desired I-picture are coupled to the video decoder 250 as video elementary stream VE. That is, in the case of PID 3 including the access units of the desired I-picture-picture, all the packets associated with PID 3 are coupled to the video decoder-picture Thus, at step 915 a first GOP access unit comprising a sequence header, a group start header, a frame start code indicative of the start of the desired I-picture-picture and the desired I-picture-picture are coupled to video decoder 250. The method 900 then proceeds to step 920.

At step 920 information within the transport packets associated with PID1 are coupled to the video decoder 250 as video elementary stream VE until the next PID is detected. That is, all of the non-I-picture-pictures of a GOP that have been previously transport packetized into the PID1 stream are coupled to the video decoder 250. The effect of steps 915 and 920 is to couple to video decoder 250 an entire GOP comprising an I-picture and a plurality of P- and/or B-pictures. The video decoder 250, in response to the video elementary stream VE received from a transport demultiplexer 230 produces a decoded video signal VD. The method 900 then proceeds to step 925.

At step 925 a query is made as to whether the desired I-picture has changed. If the query at step 925 is answered negatively, then the method 900 proceeds to step 910 where the transport demultiplexer 230 waits for a PID of the desired I-picture. The query at step 925 is answered affirmatively, then the PID of the new desired I-picture is identified and the method 900 proceeds to step 910.

The method 900 of FIG. 9 is used to produce a valid MPEG video elementary stream VE by concatenating a desired I-picture and a plurality of P- and/or B-pictures forming a pre-defined GOP structure.

Figure 10A:
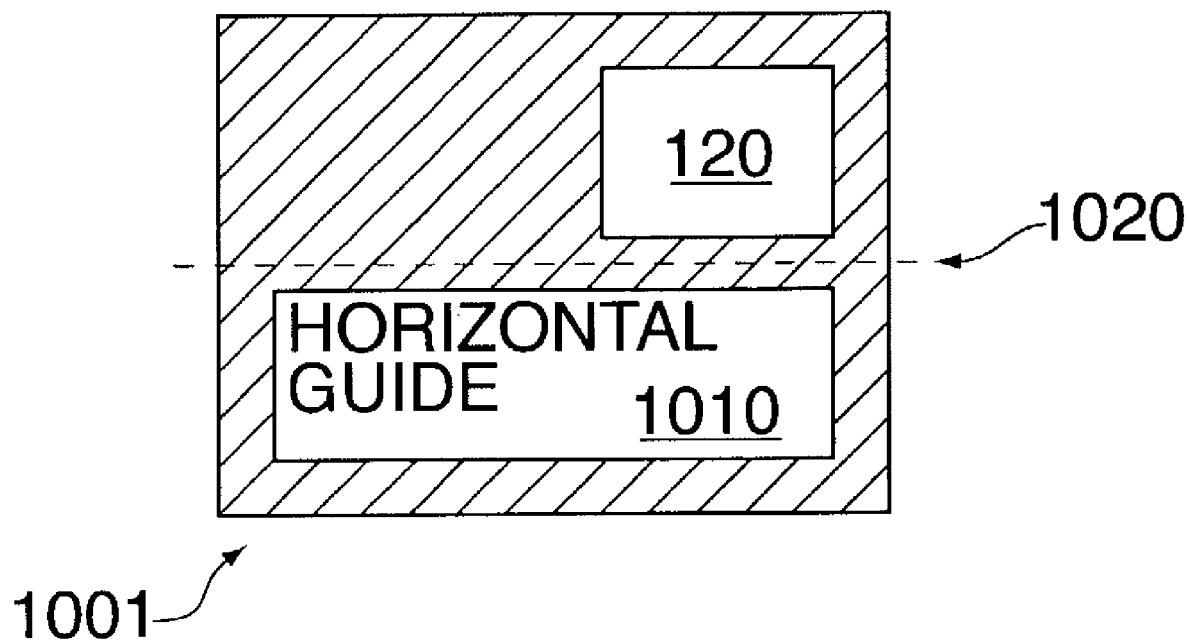
FIGS. 10A and 10B depict respective embodiments of an electronic program guide screens.
Figure 10B:
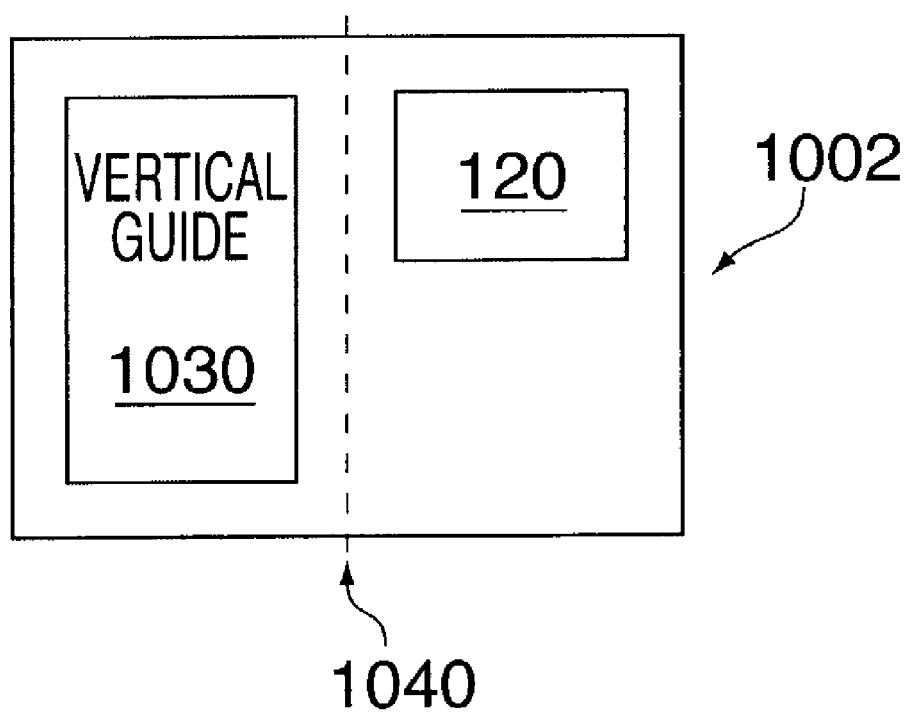

FIG. 10A depicts an electronic program guide screen according to one embodiment o the invention. Specifically, FIG. 10A depicts an electronic program guide screen 1001 comprising a horizontally disposed guide region 1010 occupying a large portion of a lower half of the EPG screen 1001, and a video barker or image portion 120 occupying a portion of the top half of the IPG screen 1001. It is noted that the amount of coding required to provide encoded video information to the upper half of the program guide screen 1001 is considerably more complex than the amount required for the lower half, since the upper half contains dynamic imagery representing the video barker while the lower half contains static imagery representing guide information.

It is important to note that the video barker 120 within the upper half of the IPG screen 1001 is the same regardless of the contents of the horizontal guide portion 1010 of the EPG screen 1001. Thus, referring now to FIG. 6, in comparing the outputs of the ten real time encoders 620-1 through 620-10 that are used to encode the ten channel guide representative video streams V1-V10, it will be realized that only the I-pictures of these video streams will be different. That is, the forward predicted (P-pictures) and bi-directionally predicted (B-pictures) of the ten encoded MPEG streams produced by the real time encoder 620, assuming the same GOP structure) will be substantially the same. This is because, the only difference between frames within a GOP is the difference caused by changes in the moving image within the video barker 120. However, the image within the horizontal guide portion 1010 and other portions of the IPG screen does not change. Thus, the only difference between the video streams is the difference in the I-pictures.

The above described invention dramatically increases the amount of IPG information that may be usefully transmitted to a subscriber. Specifically, in one embodiment of the invention a 64 quadrature amplitude modulated (QAM) super transport stream having a data rate of 27 Mbps has a bandwidth utilization as follows: first, one Mbps is utilized for audio information, data information and associated overhead such as packetization. This leaves 26 Mbps to encode the video streams. Assuming a relatively high level of video quality, each video stream to be encoded is allocated 2 Mbps of bandwidth, thereby resulting in a capability of 13 video streams per super transport stream. It is noted that each of these 13 video streams comprises a full encoded video stream, that is, a video stream comprising an encoded I-picture and a plurality of P- and B-pictures according to a GOP structure.

Utilizing the data structure of the present invention, only one full GOP structure or video stream is required. Thus, the available 26 megabits per second is reduced to 24 Mbps after allocating bandwidth for one full video stream. If an I-picture occupies approximately 20 per cent of the information within a GOP, it may be further assumed that an I-picture occupies 400 kbps. Therefore, the number of I-pictures capable of being transmitted in the remaining 24 Mbps is 60 (24 Mbps divided by 400 kbps equals 60). Therefore, it can be seen that the method of the present invention allows for 61 video streams within a 27 Mbps transport stream versus 13 video streams in an implementation not benefiting from the invention.

Although various embodiments which incorporate the teachings of the present invention have been shown and described in detail herein, those skilled in the art can readily devise many other varied embodiments that still incorporate these teachings.

What is claimed is:

1. An apparatus, comprising:
    a first compositor configured to receive a first guide region image signal;
    a second compositor configured to receive a second guide region image signal;
    the first compositor and the second compositor configured to receive an image region image signal;
    the first compositor configured to provide a first video output stream, the first video output stream being a composition of the image region image signal and the first guide region image signal;
    the second compositor configured to provide a second video output stream, the second video output stream being a composition of the image region image signal and the second guide region image signal;
    an audio delay configured to receive an audio signal and provide a delayed audio signal packet alignment with the first video output stream and the second video output stream;
    a data processor configured to receive an input data stream and to provide an output data stream;
    a first real-time video encoder configured to receive the first video output stream and a first packet identification assignment, and to provide in response thereto a first compressed video bitstream;
    a second real-time video encoder configured to receive the second video output stream and a second packet identification assignment, and to provide in response thereto a second compressed video bitstream;
    a real-time audio encoder configured to receive the delayed audio signal and to provide an encoded audio stream;
    a first frame isolator configured to receive the first compressed video bit steam and to isolate pictures therefrom for providing a first picture bitstream associated with the first guide region image signal and a second picture bitstream associated with the image region image signal;
    a second frame isolator configured to receive the second compressed video bitstream and to produce a third picture bitstream associated with second guide region image signal;
    a first packetizer configured to receive the first picture bitstream and to provide a first packetized stream in response;
    a second packetizer configured to receive the second picture bitstream and to provide a second packetized stream in response;
    a third packetizer configured to receive the third picture bitstream and to provide a third packetized stream in response;
    a fourth packetizer configured to receive the encoded audio stream and to provide a packetized audio stream in response;
    a fifth packetizer configured to receive the data output stream and to provide a packetized data stream in response; and
    a multiplexer configured to receive and multiplex the first packetized stream, the second packetized stream, the third packetized stream, the packetized audio stream and the packetized data stream to provide a transport stream.

2. The apparatus of claim 1 wherein the first compressed video bitstream is Moving Pictures Expert Group compliant.

3. The apparatus of claim 2 wherein the first compressed video bitstream is associated with a group of pictures structure.

4. The apparatus of claim 3 wherein the group of pictures structure comprises an I-picture followed by ten B-pictures with a P-picture separating each group of two contiguous B-pictures of the ten B-pictures.

5. The apparatus of claim 3 wherein the group of pictures is a closed group of pictures structure.

6. The apparatus of claim 3 wherein the group of pictures is an open group of pictures structure.

7. The apparatus of claim 3 wherein the second compressed video bitstream is associated with the group of pictures structure.

8. The apparatus of claim 3 wherein the second compressed video bitstream is associated with another group of pictures structure different from the group of pictures structure.

9. The apparatus of claim 1 wherein the first frame isolator is configured to Identify which access units are associated with respective I-pictures. B-pictures and P-pictures.

10. The apparatus of claim 9 wherein each of the access units is a coded representation of a video frame.

11. The apparatus of claim 1 wherein the first picture bitstream comprises only I-picture access units.

12. The apparatus of claim 11 wherein the second picture bitstream comprises only P-picture access units and B-picture access units.

13. The apparatus of claim 12 wherein the third picture bitstream comprises only I-picture access units.

14. The apparatus of claim 1 wherein an image associated with the image region image signal is overlaid a first guide image associated with the first guide region image signal.

15. The apparatus of claim 14 wherein the image is moving imagery, and the first guide image is a still imagery.

16. The apparatus of claim 1 further comprising:
    a first buffer configured to receive the first packetized stream and to buffer the first packetized stream for providing to the multiplexer;
    a second buffer configured to receive the second packetized stream and to buffer the second packetized stream for providing to the multiplexer; and
    a third buffer configured to receive the third packetized stream and to buffer the third packetized stream for providing to the multiplexer.

17. The apparatus of claim 16 wherein the transport stream is a Moving Pictures Expert Group (MPEG) compliant transport stream.

18. The apparatus of claim 17 wherein the MPEG compliant transport stream represents at least a portion of an interactive electronic program guide.

19. A method for frame isolation from a video data stream provided to a frame isolator, comprising:
   obtaining a first picture start code from the video data stream;
   accepting data from the video data stream after obtaining the first picture frame start code until obtaining a second picture start code; and
   outputting I-picture data of the data accepted from the frame isolator.

20. The method of claim 19 further comprising determining whether to process non-I-picture data.

21. The method of claim 20 further comprising if the step of determining is to process the non-I-picture data, providing the non-I-picture data to a packetizer.

22. The method of claim 19 further comprising if the step of determining is not to process the non-I-picture data, discarding the non-I-picture data.

23. The method of claim 19 wherein the first picture start code is a sequence header or group of pictures start code for an I-picture.

24. The method of claim 19 wherein the data accepted comprises a sequence header and an I-picture start code.

25. The method of claim 24 wherein the data accepted comprises an I-picture.

26. A method for processing a group of pictures (GOP) data structure in a transport stream having multiplexed video streams, comprising:
   providing a packet identification, the packet identification associated with a video stream of the multiplexed video streams;
   selecting the video stream in response to the packet identWication (PID), the video stream having only intra-coded information;
   decoding the video stream;
   decoding another video stream having only predictive-coded information; and
   generating a decoded video stream from the video stream and the another video stream.

27. The method of claim 26 wherein the step of selecting comprises demultiplexing the multiplexed video streams to identify the PID.

28. The method of claim 27 wherein the step of generating comprises concatenating the intra-coded information with the predictive-coded information to provide a predefined group of pictures structure.

* * * * *

UNITED STATES PATENT AND TRADEMARK OFFICE
CERTIFICATE OF CORRECTION

PATENT NO.         : 7,260,147 B2
APPLICATION NO. : 10/464370
DATED                  : August 21, 2007
INVENTOR(S)        : Donald F. Gordon et al.

It is certified that error appears in the above-identified patent and that said Letters Patent is hereby corrected as shown below:

Title page, Item (75), Inventors, line 8, delete "Redwood Shores" and insert instead --Redwood City--.

Title page, Item 57, Abstract, line 1, delete "representing" and insert instead --represent--.

Column 3, line 64, delete "example.," and insert instead --example,--.

Column 5, line 8, delete "a the" and insert instead --and the--; line 24, after "utilization" insert --are--; line 43, delete "receivers," and insert instead --receives,--; line 56, delete "stream A" and insert instead --stream AE--; line 57, delete "stream V" and insert instead --stream VE--; line 57, delete "stream A" and insert instead --stream AE--; line 61, delete "stream V" and insert instead --stream VE--; line 63, delete "stream V" and insert instead --stream VE--.

Column 9, line 16, delete "point cast" and insert instead --pointcast--; line 18, delete "point cast" and insert instead --pointcast--.

Column 16, line 37, delete "point cast" and insert instead --pointcast--; line 41, delete "point cast" and insert instead --pointcast--; line 58, delete "point cast" and insert instead --pointcast--.

Column 18, line 23, delete "S3-S1" and insert instead --S3-S10--.

Column 21, line 7, delete "650-611" and insert instead --650-11--; line 19, delete "PIC" and insert instead --PID--.

Column 23, line 60, delete "picture Thus,'" and insert instead --picture. Thus,--.

Column 26, line 39, in claim 9, delete "Identify" and insert instead --identify--; line 40, in claim 9, delete "I-pictures." And insert instead --i-pictures,--.

Column 28, line 10, in claim 26, delete "identWication" and insert instead --identification--.

Signed and Sealed this

Sixth Day of November, 2007

JON W. DUDAS
*Director of the United States Patent and Trademark Office*